United States Patent
Elshafie et al.

(10) Patent No.: US 12,155,485 B2
(45) Date of Patent: Nov. 26, 2024

(54) TRANSMISSION OF DIFFERENT NUMBERS OF HARQ-ACK/NACK PACKETS FOR DIFFERENT SEMI-PERSISTENT SCHEDULING CONFIGURATION PRIORITIES

(71) Applicant: QUALCOMM Incorporated, San Diego, CA (US)

(72) Inventors: Ahmed Elshafie, San Diego, CA (US); Yi Huang, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 659 days.

(21) Appl. No.: 17/449,604

(22) Filed: Sep. 30, 2021

(65) Prior Publication Data
US 2022/0103304 A1     Mar. 31, 2022

Related U.S. Application Data

(60) Provisional application No. 63/085,435, filed on Sep. 30, 2020.

(51) Int. Cl.
*H04L 1/18*           (2023.01)
*H04L 1/1812*      (2023.01)
(Continued)

(52) U.S. Cl.
CPC .......... *H04L 1/1819* (2013.01); *H04L 5/0053* (2013.01); *H04W 72/0446* (2013.01); *H04W 72/1273* (2013.01); *H04W 72/566* (2023.01)

(58) Field of Classification Search
CPC ... H04L 1/1819; H04L 5/0053; H04L 1/1835; H04L 1/1854; H04L 1/1861;
(Continued)

(56) References Cited

U.S. PATENT DOCUMENTS 11,412,461 B2 *   8/2022   Lee ......................... H04L 1/1692
2021/0391956 A1 *   12/2021   Gou ....................... H04L 1/1896
(Continued)

*Primary Examiner* — Hoang-Chuong Q Vu
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may receive an indication of a first subset size parameter associated with a first priority, and an indication of a second subset size parameter associated with a second priority. The UE may determine a first set of HARQ-ACK/NACK feedback associated with downlink communications having the first priority and a second set of HARQ-ACK/NACK feedback associated with downlink communications having the second priority. The UE may select a first subset of HARQ-ACK/NACK feedback from the first set of HARQ-ACK/NACK feedback based on the first subset size parameter, and a second subset of HARQ-ACK/NACK feedback from the second set of HARQ-ACK/NACK feedback based on the second subset size parameter. The UE may transmit, during the uplink slot, the first subset and/or the second subset of HARQ-ACK/NACK feedback. Numerous other aspects are provided.

30 Claims, 10 Drawing Sheets

(51) Int. Cl.
*H04L 5/00* (2006.01)
*H04W 72/04* (2023.01)
*H04W 72/0446* (2023.01)
*H04W 72/12* (2023.01)
*H04W 72/1273* (2023.01)
*H04W 72/566* (2023.01)

(58) Field of Classification Search
CPC ... H04L 1/1896; H04L 5/0094; H04L 5/0055; H04W 72/0446; H04W 72/1273; H04W 72/566
See application file for complete search history.

(56) References Cited

U.S. PATENT DOCUMENTS

| | | | |
|---|---|---|---|
| 2022/0183024 A1* | 6/2022 | Andersson | H04W 72/1273 |
| 2022/0225400 A1* | 7/2022 | Wong | H04L 1/1854 |
| 2023/0031360 A1* | 2/2023 | Zhang | H04L 1/1861 |
| 2023/0074723 A1* | 3/2023 | Alfarhan | H04L 1/1685 |
| 2024/0187196 A1* | 6/2024 | Kim | H04L 1/1854 |

* cited by examiner

TRANSMISSION OF DIFFERENT NUMBERS OF HARQ-ACK/NACK PACKETS FOR DIFFERENT SEMI-PERSISTENT SCHEDULING CONFIGURATION PRIORITIES

CROSS-REFERENCE TO RELATED APPLICATION

This Patent Application claims priority to U.S. Provisional Patent Application No. 63/085,435, filed on Sep. 30, 2020, entitled "TRANSMISSION OF DIFFERENT NUMBERS OF HARQ-ACK/NACK PACKETS FOR DIFFERENT SEMI-PERSISTENT SCHEDULING CONFIGURATION PRIORITIES," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for transmission of different numbers of hybrid automatic repeat request (HARQ) feedback packets for different semi-persistent scheduling (SPS) configuration priorities.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a UE includes receiving an indication of a first subset size parameter for consolidated hybrid automatic repeat request (HARQ) acknowledgment or negative acknowledgment (HARQ-ACK/NACK) feedback associated with downlink communications having a first priority, and an indication of a second subset size parameter for consolidated HARQ-ACK/NACK feedback associated with downlink communications having a second priority; determining a first set of HARQ-ACK/NACK feedback associated with a set of downlink communications having the first priority and a second set of HARQ-ACK/NACK feedback associated with a set of downlink communications having the second priority; selecting, for an uplink slot, a first subset of HARQ-ACK/NACK feedback from the first set of HARQ-ACK/NACK feedback based at least in part on the first subset size parameter, and a second subset of HARQ-ACK/NACK feedback from the second set of HARQ-ACK/NACK feedback based at least in part on the second subset size parameter; and transmitting, during the uplink slot, at least one of the first subset of HARQ-ACK/NACK feedback or the second subset of HARQ-ACK/NACK feedback.

In some aspects, a method of wireless communication performed by a base station includes transmitting, to a UE, an indication of a first subset size parameter for consolidated HARQ-ACK/NACK feedback associated with downlink communications having a first priority, and an indication of a second subset size parameter for consolidated HARQ-ACK/NACK feedback associated with downlink communications having a second priority; transmitting, to the UE, downlink communications, including a set of downlink communications having the first priority and a set of downlink communications having the second priority; and receiving, from the UE during an uplink slot, at least one of a first subset of HARQ-ACK/NACK feedback associated with the set of downlink communications having the first priority based at least in part on the first subset size parameter, or a second subset of HARQ-ACK/NACK feedback associated with the set of downlink communications having the second priority based at least in part on the second subset size parameter.

In some aspects, a UE for wireless communication includes a memory and one or more processors operatively coupled to the memory, the memory and the one or more processors configured to: receive an indication of a first subset size parameter for consolidated HARQ-ACK/NACK feedback associated with downlink communications having a first priority, and an indication of a second subset size parameter for consolidated HARQ-ACK/NACK feedback associated with downlink communications having a second priority; determine a first set of HARQ-ACK/NACK feedback associated with a set of downlink communications having the first priority and a second set of HARQ-ACK/NACK feedback associated with a set of downlink communications having the second priority; select, for an uplink slot, a first subset of HARQ-ACK/NACK feedback from the first set of HARQ-ACK/NACK feedback based at least in part on the first subset size parameter, and a second subset of HARQ-ACK/NACK feedback from the second set of HARQ-ACK/NACK feedback based at least in part on the second subset size parameter; and transmit, during the uplink slot, at least one of the first subset of HARQ-ACK/NACK feedback or the second subset of HARQ-ACK/NACK feedback.

In some aspects, a base station for wireless communication includes a memory and one or more processors operatively coupled to the memory, the memory and the one or more processors configured to: transmit, to a UE, an indication of a first subset size parameter for consolidated HARQ-ACK/NACK feedback associated with downlink communications having a first priority, and an indication of a second subset size parameter for consolidated HARQ-ACK/NACK feedback associated with downlink communications having a second priority; transmit, to the UE, downlink communications, including a set of downlink communications having the first priority and a set of downlink communications having the second priority; and receive, from the UE during an uplink slot, at least one of a first subset of HARQ-ACK/NACK feedback associated with the set of downlink communications having the first priority based at least in part on the first subset size parameter, or a second subset of HARQ-ACK/NACK feedback associated with the set of downlink communications having the second priority based at least in part on the second subset size parameter.

In some aspects, a non-transitory computer-readable medium storing a set of instructions for wireless communication includes one or more instructions that, when executed by one or more processors of a UE, cause the UE to: receive an indication of a first subset size parameter for consolidated HARQ-ACK/NACK feedback associated with downlink communications having a first priority, and an indication of a second subset size parameter for consolidated HARQ-ACK/NACK feedback associated with downlink communications having a second priority; determine a first set of HARQ-ACK/NACK feedback associated with a set of downlink communications having the first priority and a second set of HARQ-ACK/NACK feedback associated with a set of downlink communications having the second priority; select, for an uplink slot, a first subset of HARQ-ACK/NACK feedback from the first set of HARQ-ACK/NACK feedback based at least in part on the first subset size parameter, and a second subset of HARQ-ACK/NACK feedback from the second set of HARQ-ACK/NACK feedback based at least in part on the second subset size parameter; and transmit, during the uplink slot, at least one of the first subset of HARQ-ACK/NACK feedback or the second subset of HARQ-ACK/NACK feedback.

In some aspects, a non-transitory computer-readable medium storing a set of instructions for wireless communication includes one or more instructions that, when executed by one or more processors of a base station, cause the base station to: transmit, to a UE, an indication of a first subset size parameter for consolidated HARQ-ACK/NACK feedback associated with downlink communications having a first priority, and an indication of a second subset size parameter for consolidated HARQ-ACK/NACK feedback associated with downlink communications having a second priority; transmit, to the UE, downlink communications, including a set of downlink communications having the first priority and a set of downlink communications having the second priority; and receive, from the UE during an uplink slot, at least one of a first subset of HARQ-ACK/NACK feedback associated with the set of downlink communications having the first priority based at least in part on the first subset size parameter, or a second subset of HARQ-ACK/NACK feedback associated with the set of downlink communications having the second priority based at least in part on the second subset size parameter.

In some aspects, an apparatus for wireless communication includes means for receiving an indication of a first subset size parameter for consolidated HARQ-ACK/NACK feedback associated with downlink communications having a first priority, and an indication of a second subset size parameter for consolidated HARQ-ACK/NACK feedback associated with downlink communications having a second priority; means for determining a first set of HARQ-ACK/NACK feedback associated with a set of downlink communications having the first priority and a second set of HARQ-ACK/NACK feedback associated with a set of downlink communications having the second priority; means for selecting, for an uplink slot, a first subset of HARQ-ACK/NACK feedback from the first set of HARQ-ACK/NACK feedback based at least in part on the first subset size parameter, and a second subset of HARQ-ACK/NACK feedback from the second set of HARQ-ACK/NACK feedback based at least in part on the second subset size parameter; and means for transmitting, during the uplink slot, at least one of the first subset of HARQ-ACK/NACK feedback or the second subset of HARQ-ACK/NACK feedback.

In some aspects, an apparatus for wireless communication includes means for transmitting, to a UE, an indication of a first subset size parameter for consolidated HARQ-ACK/NACK feedback associated with downlink communications having a first priority, and an indication of a second subset size parameter for consolidated HARQ-ACK/NACK feedback associated with downlink communications having a second priority; means for transmitting, to the UE, downlink communications, including a set of downlink communications having the first priority and a set of downlink communications having the second priority; and means for receiving, from the UE during an uplink slot, at least one of a first subset of HARQ-ACK/NACK feedback associated with the set of downlink communications having the first priority based at least in part on the first subset size parameter, or a second subset of HARQ-ACK/NACK feedback associated with the set of downlink communications having the second priority based at least in part on the second subset size parameter.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
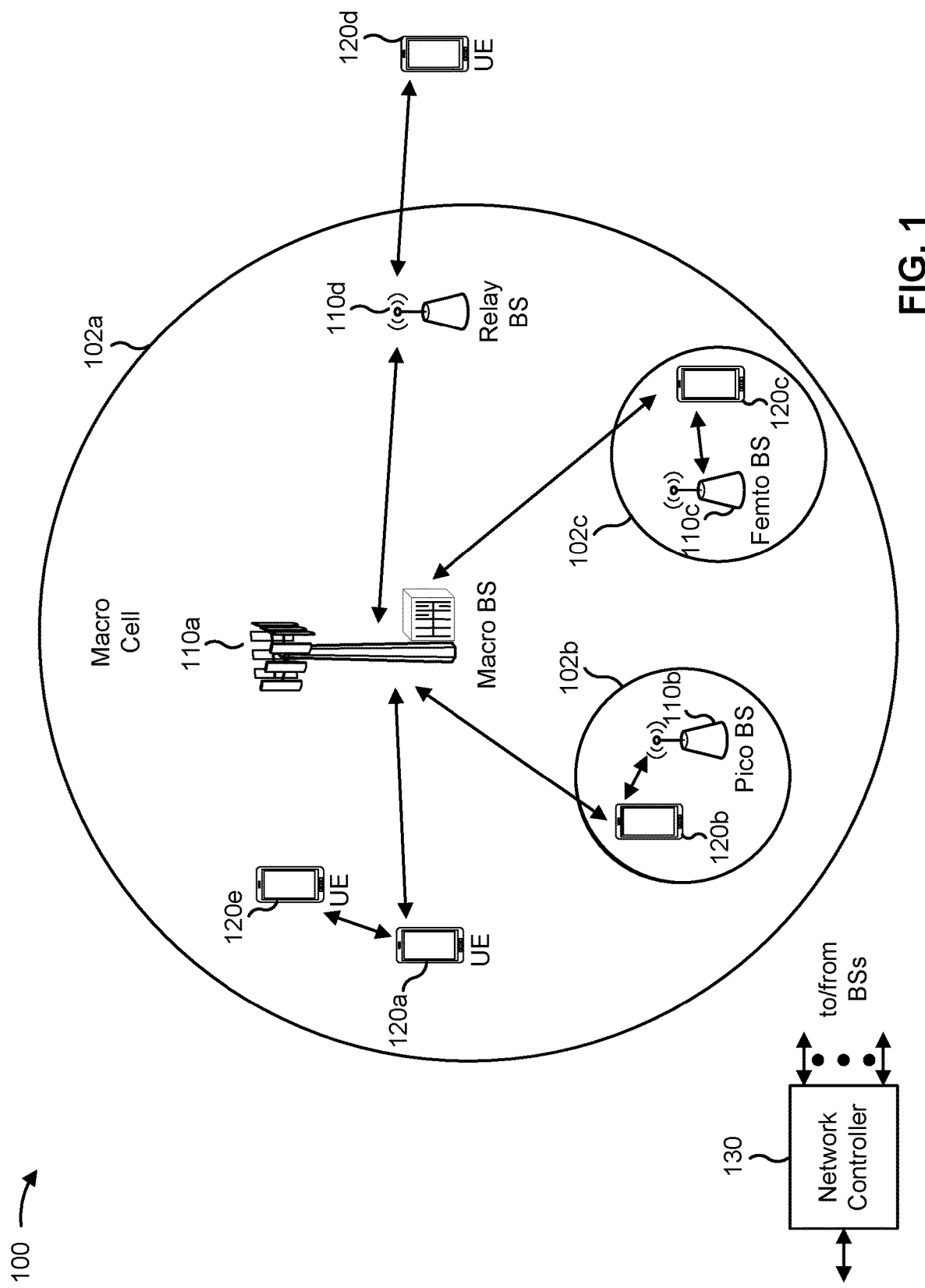
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
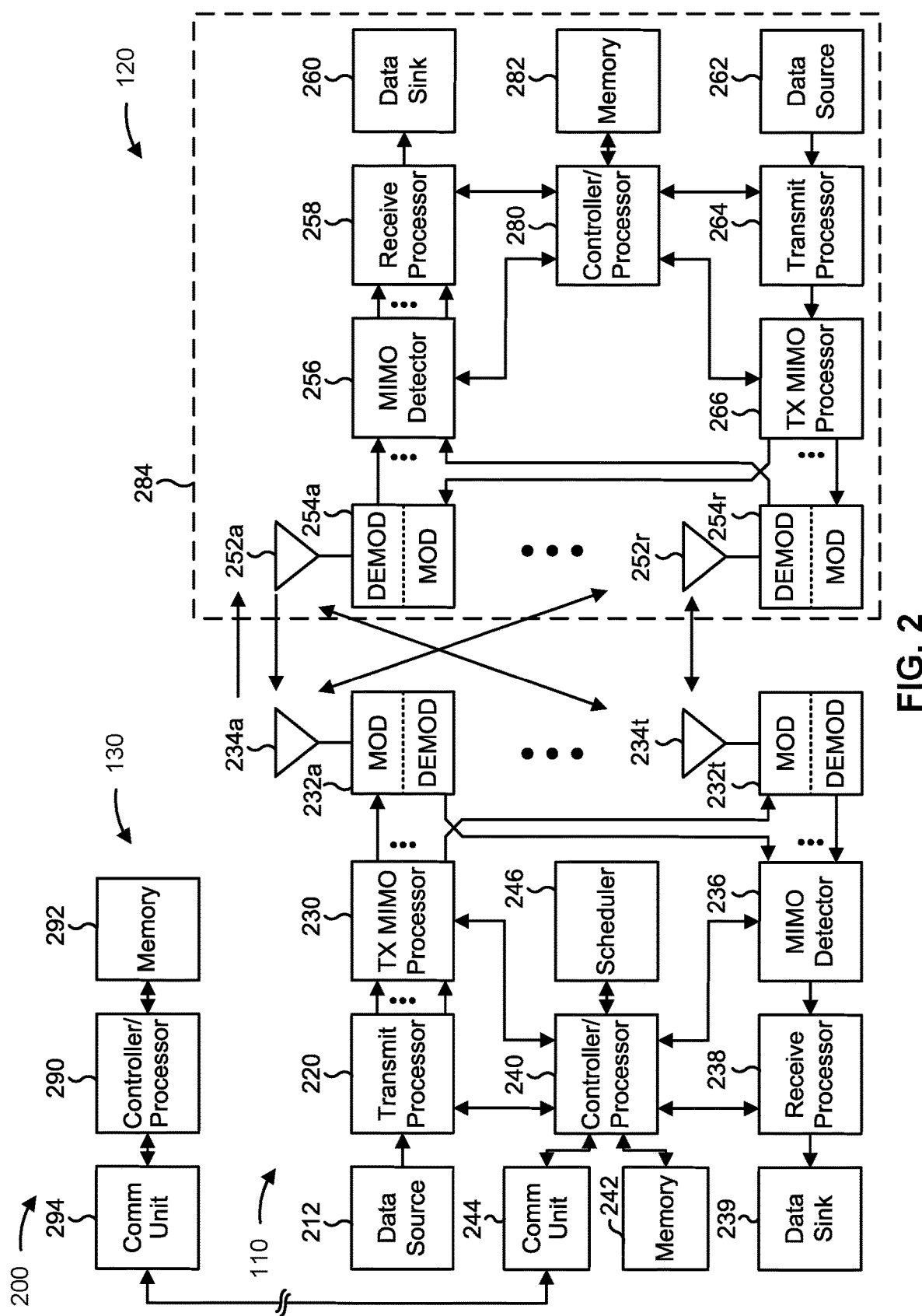
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5-8).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5-8).

Controller/processor 240 of base station 110, controller/processor 280 of UE 120, and/or any other component(s) of FIG. 2 may perform one or more techniques associated with transmission of different numbers of hybrid automatic repeat request (HARQ) feedback packets for different semi-persistent scheduling (SPS) configuration priorities, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, the UE 120 includes means for receiving an indication of a first subset size parameter for consolidated hybrid automatic repeat request (HARQ) acknowledgment or negative acknowledgment (HARQ-ACK/NACK) feedback associated with downlink communications having a first priority, and an indication of a second subset size parameter for consolidated HARQ-ACK/NACK feedback associated with downlink communications having a second priority (e.g., using antenna 252, DEMOD 254, MIMO detector 256, receive processor 258, controller/processor 280, and/or memory 282); means for determining a first set of HARQ-ACK/NACK feedback associated with a set of downlink communications having the first priority and a second set of HARQ-ACK/NACK feedback associated with a set of downlink communications having the second priority (e.g., using controller/processor 280 and/or memory 282); means for selecting, for an uplink slot, a first subset of HARQ-ACK/NACK feedback from the first set of HARQ-ACK/NACK feedback based at least in part on the first subset size parameter, and a second subset of HARQ-ACK/NACK feedback from the second set of HARQ-ACK/NACK feedback based at least in part on the second subset size parameter (e.g., using controller/processor 280 and/or memory 282); and/or means for transmitting, during the uplink slot, at least one of the first subset of HARQ-ACK/NACK feedback or the second subset of HARQ-ACK/NACK feedback (e.g., using controller/processor 280, transmit processor 264, TX MIMO processor 266, MOD 254, antenna 252, and/or memory 282). The means for the UE 120 to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, the UE 120 includes means for storing the first set of HARQ-ACK/NACK feedback associated with the set of downlink communications having the first priority in a first buffer (e.g., using controller/processor 280 and/or memory 282); and/or means for storing the second set of HARQ-ACK/NACK feedback associated with the set of downlink communications having the second priority in a second buffer (e.g., using controller/processor 280 and/or memory 282).

In some aspects, the UE 120 includes means for selecting the first number of HARQ-ACK/NACK feedback packets from the first set of HARQ-ACK/NACK feedback stored in the first buffer (e.g., using controller/processor 280 and/or memory 282); and/or means for selecting the second number of HARQ-ACK/NACK feedback packets from the second set of HARQ-ACK/NACK feedback stored in the second buffer (e.g., using controller/processor 280 and/or memory 282).

In some aspects, the UE 120 includes means for receiving a configuration indicating a first uplink resource for the first subset of HARQ-ACK/NACK feedback and a second uplink resource for the second subset of HARQ-ACK/NACK feedback (e.g., using antenna 252, DEMOD 254, MIMO detector 256, receive processor 258, controller/processor 280, and/or memory 282).

In some aspects, the UE 120 includes means for transmitting the first subset of HARQ-ACK/NACK feedback in the uplink slot using the first uplink resource (e.g., using controller/processor 280, transmit processor 264, TX MIMO processor 266, MOD 254, antenna 252, and/or memory 282); and/or means for transmitting the second subset of HARQ-ACK/NACK feedback in the uplink slot using the second uplink resource (e.g., using controller/processor 280, transmit processor 264, TX MIMO processor 266, MOD 254, antenna 252, and/or memory 282).

In some aspects, the UE 120 includes means for transmitting the first subset of HARQ-ACK/NACK feedback in the uplink slot using the first uplink resource (e.g., using controller/processor 280, transmit processor 264, TX MIMO processor 266, MOD 254, antenna 252, and/or memory 282); and/or means for deferring the second subset of HARQ-ACK/NACK feedback to a subsequent uplink slot (e.g., using controller/processor 280 and/or memory 282).

In some aspects, the UE 120 includes means for transmitting the first subset of HARQ-ACK/NACK feedback in the uplink slot using the first uplink resource (e.g., using controller/processor 280, transmit processor 264, TX MIMO processor 266, MOD 254, antenna 252, and/or memory 282); and/or means for dropping the second subset of HARQ-ACK/NACK feedback (e.g., using controller/processor 280 and/or memory 282).

In some aspects, the UE 120 includes means for multiplexing the second subset of HARQ-ACK/NACK feedback with the first subset of HARQ-ACK/NACK feedback on the first uplink resource in the uplink slot (e.g., using controller/processor 280, transmit processor 264, TX MIMO processor 266, MOD 254, antenna 252, and/or memory 282).

In some aspects, the UE 120 includes means for compressing the second subset of HARQ-ACK/NACK feedback prior to multiplexing the second subset of HARQ-ACK/NACK feedback with the first subset of HARQ-ACK/NACK feedback on the first uplink resource (e.g., using controller/processor 280 and/or memory 282).

In some aspects, the UE 120 includes means for receiving, from a base station, an indication of an action to be performed by the UE in connection with a determination that the first uplink resource and the second uplink resource at least partially overlap in a time domain (e.g., using antenna 252, DEMOD 254, MIMO detector 256, receive processor 258, controller/processor 280, and/or memory 282).

In some aspects, the UE 120 includes means for receiving the indication of the action to be performed by the UE via a radio resource control (RRC) communication, a medium access control (MAC) control element, or downlink control information (DCI) (e.g., using antenna 252, DEMOD 254, MIMO detector 256, receive processor 258, controller/processor 280, and/or memory 282).

In some aspects, the UE 120 includes means for receiving the set of downlink communications associated with the first priority during a first set of semi-persistent scheduling (SPS) downlink occasions (e.g., using antenna 252, DEMOD 254, MIMO detector 256, receive processor 258, controller/processor 280, and/or memory 282); and/or means for receiving the set of downlink communications associated with the second priority during a second set of SPS downlink occasions (e.g., using antenna 252, DEMOD 254, MIMO detector 256, receive processor 258, controller/processor 280, and/or memory 282).

In some aspects, the base station 110 includes means for transmitting, to a UE, an indication of a first subset size parameter for consolidated HARQ-ACK/NACK feedback associated with downlink communications having a first priority, and an indication of a second subset size parameter for consolidated HARQ-ACK/NACK feedback associated with downlink communications having a second priority (e.g., using controller/processor 240, transmit processor 220, TX MIMO processor 230, MOD 232, antenna 234, and/or memory 242); means for transmitting, to the UE, downlink communications, including a set of downlink communications having the first priority and a set of downlink communications having the second priority (e.g., using controller/processor 240, transmit processor 220, TX MIMO processor 230, MOD 232, antenna 234, and/or memory 242); and means for receiving, from the UE during an uplink slot, at least one of a first subset of HARQ-ACK/NACK feedback associated with the set of downlink communications having the first priority based at least in part on the first subset size parameter, or a second subset of HARQ-ACK/NACK feedback associated with the set of downlink communications having the second priority based at least in part on the second subset size parameter (e.g., using antenna 234, DEMOD 232, MIMO detector 236, receive processor 238, controller/processor 240, and/or memory 242). The means for the base station 110 to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246.

In some aspects, the base station 110 includes means for transmitting, to the UE, a configuration indicating a first uplink resource for the first subset of HARQ-ACK/NACK feedback and a second uplink resource for the second subset of HARQ-ACK/NACK feedback (e.g., using controller/processor 240, transmit processor 220, TX MIMO processor 230, MOD 232, antenna 234, and/or memory 242).

In some aspects, the base station 110 includes means for receiving the first subset of HARQ-ACK/NACK feedback in the uplink slot on the first uplink resource; and/or means for receiving the second subset of HARQ-ACK/NACK feedback in the uplink slot on the second uplink resource (e.g., using antenna 234, DEMOD 232, MIMO detector 236, receive processor 238, controller/processor 240, and/or memory 242).

In some aspects, the base station 110 includes means for receiving the first subset of HARQ-ACK/NACK feedback in the uplink slot using the first uplink resource (e.g., using antenna 234, DEMOD 232, MIMO detector 236, receive processor 238, controller/processor 240, and/or memory 242).

In some aspects, the base station 110 includes means for receiving the second subset of HARQ-ACK/NACK feedback multiplexed with the first subset of HARQ-ACK/NACK feedback on the first uplink resource in the uplink slot (e.g., using antenna 234, DEMOD 232, MIMO detector 236, receive processor 238, controller/processor 240, and/or memory 242).

In some aspects, the base station 110 includes means for transmitting, to the UE, an indication of an action to be performed by the UE in connection with a determination that the first uplink resource and the second uplink resource at least partially overlap in a time domain (e.g., using controller/processor 240, transmit processor 220, TX MIMO processor 230, MOD 232, antenna 234, and/or memory 242).

In some aspects, the base station 110 includes means for transmitting the indication of the action to be performed by the UE via an RRC communication, a MAC control element, or DCI (e.g., using controller/processor 240, transmit processor 220, TX MIMO processor 230, MOD 232, antenna 234, and/or memory 242).

In some aspects, the base station 110 includes means for transmitting, to the UE, the set of downlink communications associated with the first priority during a first set of SPS downlink occasions (e.g., using controller/processor 240, transmit processor 220, TX MIMO processor 230, MOD 232, antenna 234, and/or memory 242); and/or means for transmitting, to the UE, the set of downlink communications associated with the second priority during a second set of SPS downlink occasions (e.g., using controller/processor 240, transmit processor 220, TX MIMO processor 230, MOD 232, antenna 234, and/or memory 242).

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
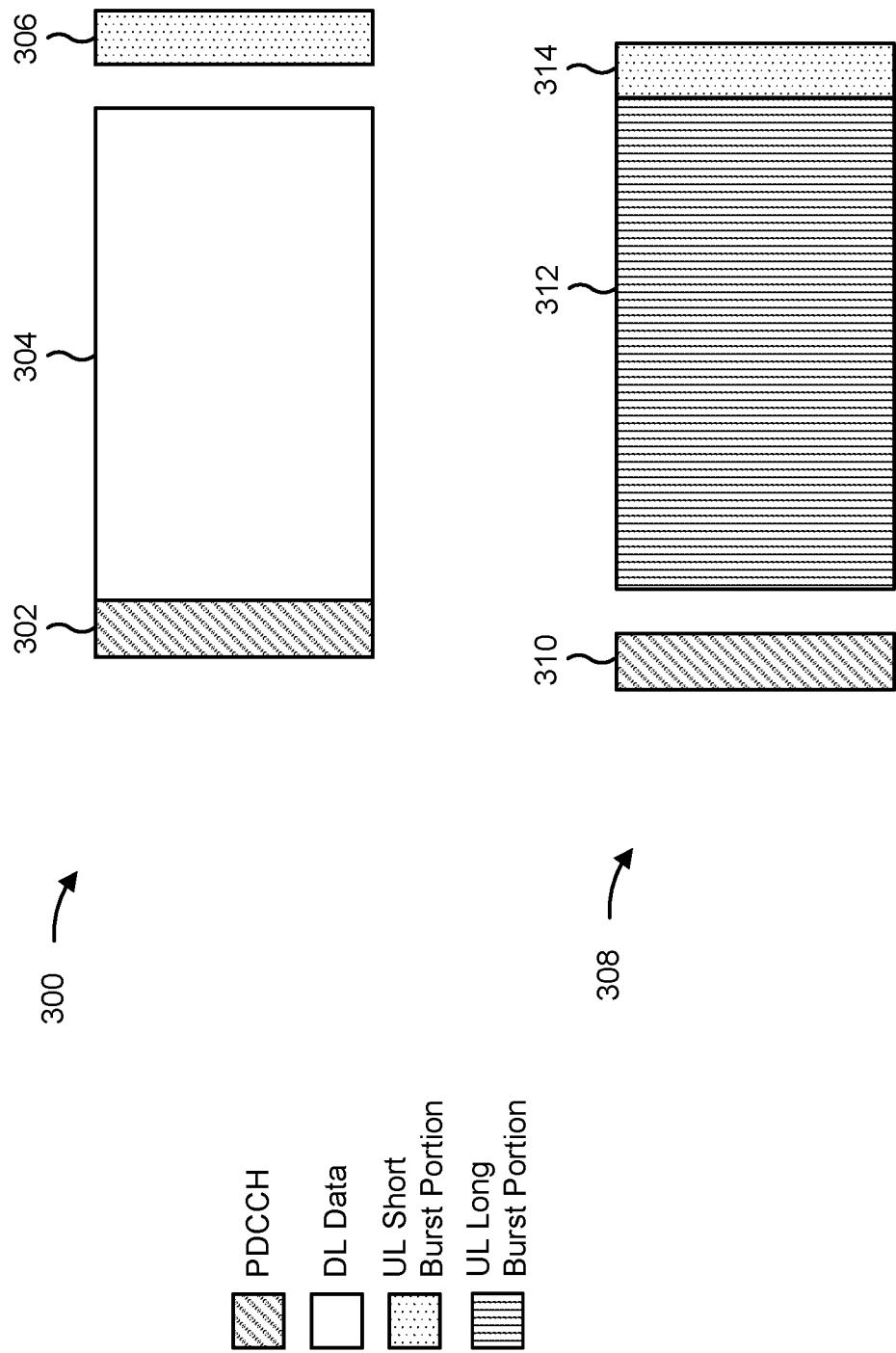
FIG. 3 is a diagram illustrating an example of downlink (DL)-centric slot or communication structure and an uplink (UL)-centric slot or communication structure, in accordance with the present disclosure.

FIG. 3 is a diagram showing an example of downlink (DL)-centric slot or communication structure 300 and an uplink (UL)-centric slot or communication structure 308, in accordance with the present disclosure. The downlink-centric slot (or wireless communication structure) 300 may include a control portion 302 during which the scheduling entity (for example, a UE or a BS) transmits various scheduling information or control information corresponding to various portions of the downlink-centric slot to the subordinate entity (for example, a UE). The control portion 302 may exist in the initial or beginning portion of the downlink-centric slot 300. In some configurations, the control portion 302 may be a physical downlink control channel PDCCH, as indicated in FIG. 3. In some aspects, the control portion 302 may include legacy PDCCH information, shortened PDCCH (sPDCCH) information), a control format indicator (CFI) value (for example, carried on a physical control format indicator channel (PCFICH)), one or more grants (for example, downlink grants, or uplink grants), among other examples, or combinations thereof.

The downlink-centric slot 300 may also include a downlink data portion 304 during which the scheduling entity (for example, a UE or a BS) transmits downlink data to the subordinate entity (for example, a UE) using communication resources utilized to communicate downlink data. The downlink data portion 304 may sometimes be referred to as the payload of the downlink-centric slot 300. In some configurations, the downlink data portion 304 may be a physical downlink shared channel (PDSCH).

The downlink-centric slot 300 may also include an uplink short burst portion 306 during which the subordinate entity (for example, a UE) transmits reference signals or feedback to the scheduling entity (for example, a UE or a BS) using communication resources utilized to communicate uplink data. The uplink short burst portion 306 may sometimes be referred to as an uplink burst, an uplink burst portion, a common uplink burst, a short burst, an uplink short burst, a common uplink short burst, a common uplink short burst portion, or various other suitable terms. In some aspects, the uplink short burst portion 306 may include one or more reference signals. Additionally or alternatively, the uplink short burst portion 306 may include feedback information corresponding to various other portions of the downlink-centric slot 300. For example, the uplink short burst portion 306 may include feedback information corresponding to the control portion 302 or the data portion 304. Non-limiting examples of information that may be included in the uplink short burst portion 306 include an acknowledgement (ACK) signal (for example, a physical uplink control channel (PUCCH) ACK, a physical uplink shared channel (PUSCH) ACK, or an immediate ACK), a negative acknowledgement (NACK) signal (for example, a PUCCH NACK, a PUSCH NACK, or an immediate NACK), a scheduling request (SR), a buffer status report (BSR), a HARQ indicator, a channel state indication (CSI), a CQI, a sounding reference signal (SRS), a demodulation reference signal (DMRS), PUSCH data, or various other suitable types of information. The uplink short burst portion 306 may include additional or alternative information, such as information pertaining to random access channel (RACH) procedures, scheduling requests, and various other suitable types of information.

As illustrated in FIG. 3, the end of the downlink data portion 304 may be separated in time from the beginning of the uplink short burst portion 306. This time separation may sometimes be referred to as a gap, a guard period, a guard interval, or various other suitable terms. This separation provides time for the switch-over from downlink communication (for example, reception operation by the subordinate entity (for example, a base station or a UE)) to uplink communication (for example, transmission by the subordinate entity (for example, a UE)). The foregoing provides some examples of a downlink-centric wireless communication structure, but alternative structures having similar features may exist without deviating from the aspects described herein.

The uplink-centric slot (or wireless communication structure) 308 may include a control portion 310. The control portion 310 may exist in the initial or beginning portion of the uplink-centric slot 308. The control portion 310 in may be similar to the control portion 302 described above with reference to the downlink-centric slot 300. The uplink-centric slot 308 may also include an uplink long burst portion 312. The uplink long burst portion 312 may sometimes be referred to as the payload of the uplink-centric slot 308. "Uplink portion" may refer to the communication resources utilized to communicate uplink data from the subordinate entity (for example, a UE) to the scheduling entity (for example, a UE or a base station). In some configurations, the control portion 310 may be a physical downlink control channel PDCCH.

As illustrated, the end of the control portion 310 may be separated in time from the beginning of the uplink long burst portion 312. This time separation may sometimes be referred to as a gap, guard period, guard interval, or various other suitable terms. This separation provides time for the switch-over from downlink communication (for example, reception operation by the scheduling entity) to uplink communication (for example, transmission operation by the scheduling entity).

The uplink-centric slot 308 may also include an uplink short burst portion 314. The uplink short burst portion 314 may be similar to the uplink short burst portion 306 described above with reference to the downlink-centric slot 300, and may include any of the information described above. The foregoing is merely one example of an uplink-centric wireless communication structure, and alternative structures having similar features may exist without deviating from the aspects described herein.

In one example, a wireless communication structure, such as a frame, may include both uplink-centric slots and downlink-centric slots. In this example, the ratio of uplink-centric slots to Downlink-centric slots in a frame may be dynamically adjusted based at least in part on the amount of uplink data and the amount of downlink data that are transmitted. For example, if there is more uplink data, then the ratio of uplink-centric slots to downlink-centric slots may be increased. Conversely, if there is more downlink data, then the ratio of uplink-centric slots to downlink-centric slots may be decreased.

As indicated above, FIG. 3 is provided as an example. Other examples may differ from what is provided with regard to FIG. 3.

Figure 4:
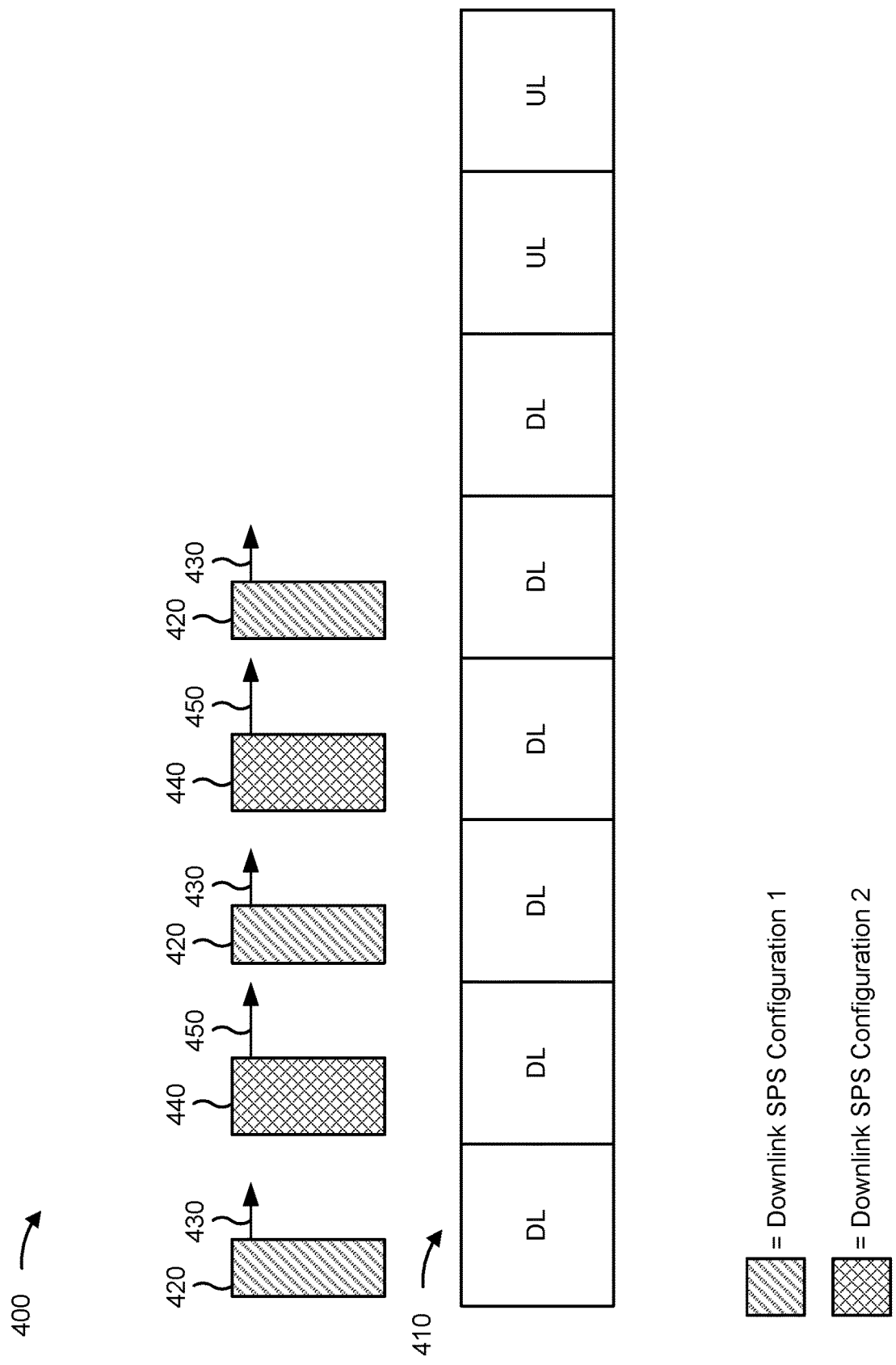
FIG. 4 is a diagram illustrating an example 400 of downlink semi-persistent scheduling (SPS) communications, in accordance with the present disclosure.

FIG. 4 is a diagram illustrating an example 400 of downlink SPS communications, in accordance with the present disclosure.

As shown in FIG. 4, a UE 120 and a base station 110 may communicate using a frame structure 410. In some aspects, the frame structure 410 may be a time division duplexing (TDD) frame structure. As shown in FIG. 4, the frame structure 410 may include a set of downlink slots (e.g., downlink-centric slots and/or downlink-only slots) and a set of uplink slots (e.g., uplink-centric slots and/or uplink-only slots).

As shown by reference number 420, a UE 120 may be configured with a first downlink SPS configuration. A downlink SPS configuration may indicate a resource allocation associated with the downlink SPS configuration and/or a periodicity associated with the downlink SPS configuration. The downlink SPS configuration may also indicate a PDSCH-to-HARQ feedback timing value, which may be referred to as a K1 value in the 3GPP standard A PDSCH-to-HARQ feedback timing value may indicate a timing (e.g., a number of slots) between a last slot of a PDSCH communication, to which the PDSCH-to-HARQ feedback timing value corresponds, and a slot in which HARQ-ACK feedback, corresponding to the PDSCH communication, is to be transmitted. Thus, the PDSCH-to-HARQ timing value may indicate a slot in which HARQ-ACK feedback, corresponding to the PDSCH communication, is to be transmitted. In some aspects, a UE 120 may receive a PDSCH-to-HARQ timing value in DCI that schedules the PDSCH communication or that activates the downlink SPS configuration. A PDSCH-to-HARQ feedback timing value may be referred to herein as a PDSCH-to-HARQ timing value or a K1 value.

As shown by reference number 440, the UE 120 may be configured with a second downlink SPS configuration. The second downlink SPS configuration may indicate a resource allocation associated with the second downlink SPS configuration and/or a periodicity associated with the second downlink SPS configuration. The first downlink SPS configuration may be associated with a K1 value 430 and the second downlink SPS configuration may be associated with a K1 value 450.

In some aspects, a downlink SPS configuration may be associated with a priority level or a priority value. For example, the first downlink SPS configuration may be a high priority downlink SPS configuration and the second downlink SPS configuration may be a low priority downlink SPS configuration. In some cases, a downlink SPS configuration may be associated with a high priority when the downlink SPS configuration is to be used to transmit high priority traffic (e.g., ultra-reliable low-latency communication (URLLC) traffic or other high priority traffic). Similarly, a downlink SPS configuration may be associated with a low priority when the downlink SPS configuration is to be used to transmit low priority traffic (e.g., Enhanced Mobile Broadband (eMBB) traffic or other low priority traffic).

As shown in FIG. 4, the K1 value 430 and/or the K1 value 450 may indicate that the UE is to transmit HARQ feedback (e.g., HARQ-ACK/NACK feedback) during a downlink slot. As a result, in some cases, there may be instances of collision between the uplink transmission of the HARQ-ACK/NACK feedback and another downlink communication transmitted to the UE during the same transmission opportunity (e.g., during the same downlink slot). Moreover, in some cases, the UE may be unable to transmit uplink communications in a downlink slot.

To ensure that the HARQ-ACK/NACK feedback for the PDSCH communications associated with the first downlink SPS configuration and the second downlink SPS configuration are transmitted to the base station, the UE may defer the HARQ-ACK reporting until a next available uplink grant (e.g., a next available uplink slot or a next available uplink transmission opportunity) by accumulating a plurality of HARQ-ACK/NACK feedback for transmission during a single uplink slot. For example, the UE may store the HARQ-ACK/NACK feedback in a buffer of the UE until the next available uplink grant.

At the next available uplink grant, the UE may select a set of HARQ-ACK/NACK feedback from the buffer to transmit to the base station in a consolidated uplink transmission (e.g., that includes the set of HARQ-ACK/NACK feedback, rather than a single HARQ-ACK/NACK feedback). However, in some cases, the set of HARQ-ACK/NACK feedback may include both high priority HARQ-ACK/NACK feedback (e.g., HARQ-ACK/NACK feedback associated with a high priority downlink SPS communication) and low priority HARQ-ACK/NACK feedback (e.g., HARQ-ACK/NACK feedback associated with a low priority downlink SPS communication). For example, the UE may store the HARQ-ACK/NACK feedback in the buffer of the UE in a first-in-first-out (FIFO) manner. As a result, when the UE is configured with downlink SPS configurations having different priority levels (e.g., as described above), the selected set of HARQ-ACK/NACK feedback may include HARQ-ACK/NACK feedback having different priority levels. Therefore, the UE may attempt to transmit low priority HARQ-ACK/NACK feedback using high priority uplink resources and/or may attempt to transmit high priority HARQ-ACK/NACK feedback using low priority uplink resources. This may result in the base station not receiving HARQ-ACK/NACK feedback, or receiving HARQ-ACK/NACK feedback on an uplink resource that is associated with a different priority level (e.g., an uplink resource that is associated with a different latency requirement and/or a different reliability requirement). Moreover, in some cases, the high priority uplink resources may overlap (e.g., in the time domain) with the low priority uplink resources. As a result, the UE may be required to drop the low priority HARQ-ACK/NACK feedback (e.g., that is to be transmitted using the low priority uplink resources) due to the collision (e.g., the overlap) with the high priority uplink resources. This may trigger a retransmission of the low priority downlink SPS communications from the base station due to the corresponding HARQ-ACK/NACK feedback being dropped by the UE, thereby consuming resources associated with the retransmissions. Furthermore, reliability of HARQ-ACK/NACK feedback transmissions can be decreased if the UE attempts to transmit too many HARQ-ACK/NACK feedback packets in the same time slot.

Some techniques and apparatuses described herein enable transmission of different numbers of HARQ-ACK/NACK feedback packets for different SPS configuration priorities. For example, a UE may receive an indication of a first subset size parameter for consolidated HARQ-ACK/NACK feedback associated with SPS configurations having a first priority (e.g., high priority) and an indication of a second subset size parameter for consolidated HARQ-ACK/NACK feedback associated with SPS configurations having a second priority (e.g., low priority). The UE may determine a first set of HARQ-ACK/NACK feedback packets associated with a set of downlink communications (e.g., SPS downlink communications) associated with downlink communications (e.g., SPS downlink communications) having the first priority and a second set of HARQ-ACK/NACK feedback packets associated with SPS downlink communications having the second priority. The UE may select, for an uplink slot, a first subset of HARQ-ACK/NACK feedback packets from the first set of HARQ-ACK/NACK feedback packets based at least in part on the first subset size parameter, and a second subset of HARQ-ACK/NACK feedback packets from the second set of HARQ-ACK/NACK feedback packets based at least in part on the second subset size parameter. The UE may transmit, during the uplink slot, at least one of the first subset of HARQ-ACK/NACK feedback packets or the second subset of HARQ-ACK/NACK feedback packets. The UE may determine whether to transmit only the first subset of HARQ-ACK/NACK feedback packets, or the first subset of HARQ-ACK/NACK feedback packets and the second subset of HARQ-ACK/NACK feedback packets, based at least in part on a determination of whether a first uplink resource for the first subset of HARQ-ACK/NACK feedback packets and a second uplink resource for the second set of HARQ-ACK/NACK feedback packets overlap in the uplink time slot. As a result, the UE may be enabled to handle different priority levels for deferred HARQ feedback reporting. This may enable the UE to transmit different quantities of HARQ-ACK/NACK feedback packets for different SPS configuration priorities and ensure that the HARQ-ACK/NACK feedback packets are transmitted on uplink resources that are associated with the correct priority levels. Moreover, this may enable the UE to ensure that both high priority HARQ-ACK/NACK feedback and low priority HARQ-ACK/NACK feedback are properly transmitted to the base station. As a result, reliability of deferred HARQ-ACK/NACK feedback may be increased and the base station may not trigger unnecessary retransmissions of the downlink SPS communications, thereby conserving resources that would have otherwise been used retransmitting the downlink SPS communications.

As indicated above, FIG. 4 is provided as an example. Other examples may differ from what is described with respect to FIG. 4.

Figure 5:
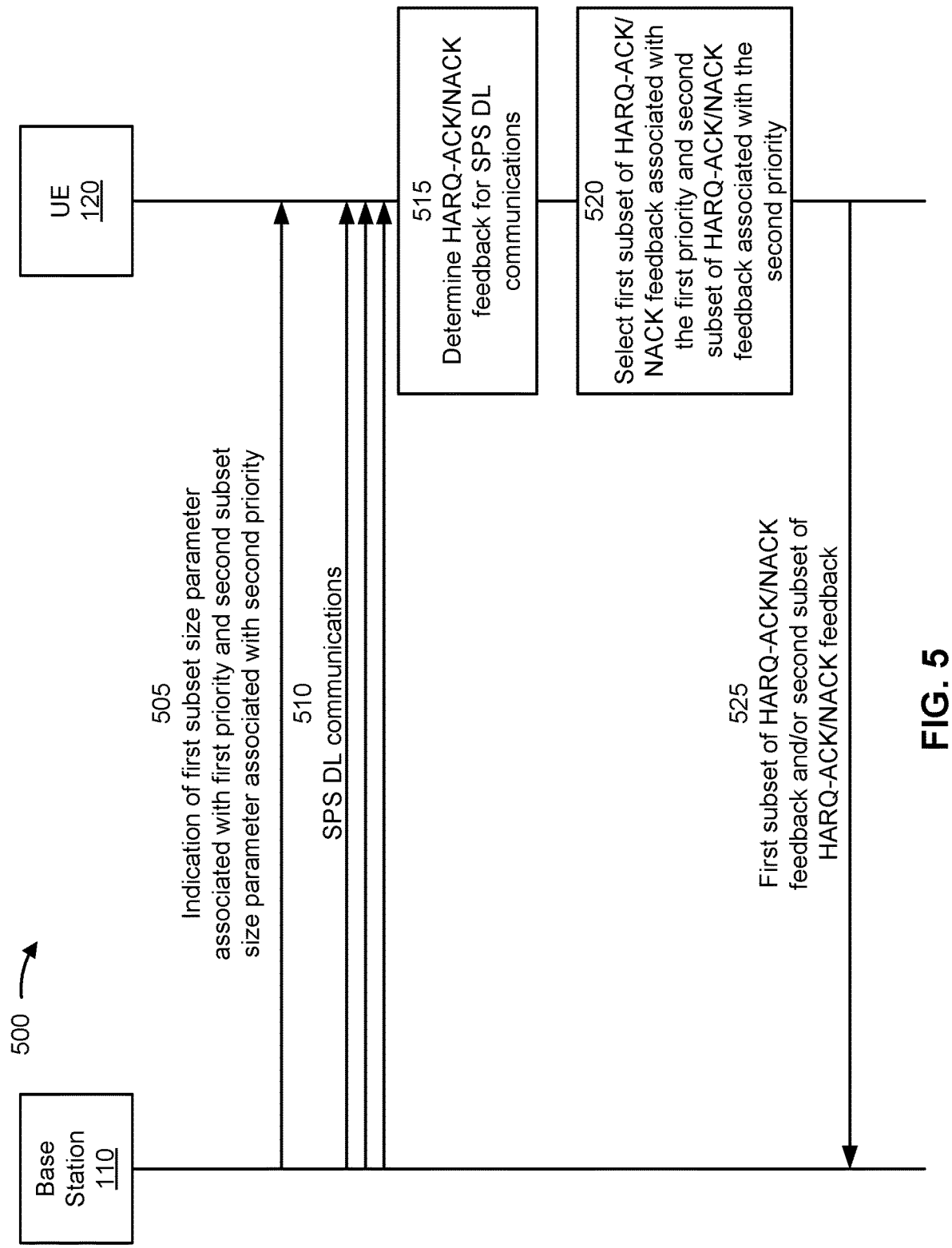
FIGS. 5-6 are diagrams illustrating examples associated with transmission of different numbers of hybrid automatic repeat request (HARQ) feedback packets for different semi-persistent scheduling (SPS) configuration priorities, in accordance with the present disclosure.

FIG. 5 is a diagram illustrating an example 500 associated with transmission of different numbers of HARQ feedback packets for different SPS configuration priorities, in accordance with the present disclosure. As shown in FIG. 5, example 500 includes communication between a base station 110 and a UE 120. In some aspects, base station 110 and UE 120 may be included in a wireless network, such as wireless network 100. Base station 110 and UE 120 may communicate on a wireless access link, which may include an uplink and a downlink.

As shown in FIG. 5, and by reference number 505, the base station 110 may transmit, to the UE 120, an indication of a first subset size parameter associated with a first SPS configuration priority and an indication of a second subset size parameter associated with a second SPS configuration priority. In some aspects, the first SPS configuration priority may be a high priority and the second SPS configuration priority may be a low priority. The first subset size parameter ("L1") may indicate a first number of HARQ feedback packets for consolidated HARQ-ACK/NACK feedback for SPS downlink communications associated with the first priority, and the second subset size parameter ("L2") may indicate a second number of HARQ feedback packets for consolidated HARQ-ACK/NACK feedback for SPS downlink communications associated with the second priority. For example, L1 may indicate a maximum number of HARQ-ACK/NACK feedback packets for SPS downlink communications associated with the first priority to be transmitted in an uplink time slot, and L2 may indicate a maximum number of HARQ-ACK/NACK feedback packets for SPS downlink communications associated with the second priority to be transmitted in an uplink time slot. In some aspects, SPS downlink communications may be configured with one or more other priorities in addition to the first priority and the second priority. In this case, the UE 120 may receive, from the base station 110, an indication of a respective subset size parameter corresponding to each priority.

In some aspects, the indication of L1 and/or the indication of L2 may be transmitted to the UE 120 via an RRC communication, a MAC control element (MAC-CE), or DCI. In some aspects, the indication of L1 and the indication of L2 may be transmitted to the UE 120 in the same communication. In some aspects, the indication of L1 and the indication of L2 may be transmitted to the UE 120 in different communications.

In some aspects, the indication of L1 may be included in a configuration of at least one SPS downlink (e.g., SPS PDSCH) configuration associated with the first priority (e.g., a high priority), and the indication of L2 may be included in a configuration of at least one SPS downlink (e.g., SPS PDSCH) configuration associated with the second priority (e.g., a low priority). In some aspects, multiple SPS downlink configurations may be associated with the first priority and/or multiple SPS downlink configurations may be associated with the second priority. An SPS downlink configuration may also indicate a periodicity for the SPS downlink communications and the PDSCH-to-HARQ timing value (K1). In some aspects, at least one SPS downlink configuration associated with the first priority may identify a first uplink resource (e.g., a PUCCH resource) for transmitting consolidated HARQ-ACK/NACK feedback packets for SPS downlink communications associated with the first priority. In some aspects, at least one SPS downlink configuration associated with the second priority may identify a second uplink resource (e.g., a PUCCH resource) for transmitting consolidated HARQ-ACK/NACK feedback packets for SPS downlink communications associated with the second priority.

In some aspects, the indication of L1 and/or the indication of L2 may be transmitted to the UE 120 in one or more communications (e.g., RRC, MAC-CE, or DCI) separate from the SPS downlink configurations. For example, the values of L1 and L2 may be dynamically indicated and/or modified by the base station 110.

As further shown in FIG. 5, and by reference number 510, the base station 110 may transmit multiple SPS downlink communications to the UE 120. The base station 110 may transmit the SPS downlink communications to the UE 120 over multiple downlink slots. In some aspects, the multiple SPS downlink communications may be associated with multiple SPS downlink configurations. The SPS downlink communications transmitted to the UE 120 may include a set of SPS downlink communications associated with the first priority (e.g., high priority SPS downlink communications) and a set of SPS downlink communications associated with the second priority (e.g., low priority SPS downlink communications).

As further shown in FIG. 5, and by reference number 515, the UE 120 may determine HARQ-ACK/NACK feedback for the SPS downlink communications received from the base station 110. In some aspects, the UE 120 may generate a respective HARQ-ACK/NACK feedback packet for each SPS downlink communication received. Each HARQ-ACK/NACK feedback packet may include one or more bits that indicate the HARQ-ACK/NACK feedback for the corresponding SPS downlink communication. Accordingly, the UE 120 may generate a first set of HARQ-ACK/NACK feedback packets associated with the set of SPS downlink communications having the first priority, and the UE 120 may generate a second set of HARQ-ACK/NACK feedback packets associated with the set of SPS downlink communications having the second priority.

The UE 120 may defer the first set of HARQ-ACK/NACK feedback packets and the second set of HARQ-ACK/NACK feedback packets until a next available uplink grant (e.g., a next available uplink slot and/or a next available uplink transmission opportunity). In some aspects, the UE 120 may store the first set of HARQ-ACK/NACK feedback packets in a first buffer associated with the first priority (e.g., the high priority), and the UE 120 may store the second set of HARQ-ACK/NACK feedback packets in a second buffer associated with the second priority (e.g., the low priority). The UE 120 may defer the first set of HARQ-ACK/NACK feedback and the second set of HARQ-ACK/NACK feedback to an available uplink slot. In some aspects, the uplink slot may be a next available uplink slot to send deferred SPS HARQ bits (e.g., the HARQ-ACK/NACK feedback for SPS communications). For example, the next available uplink slot may be a next uplink slot that has uplink OFDM symbols that fit the uplink resource(s) (e.g., PUCCH/PUSCH resource(s) configured for the HARQ-ACK/NACK feedback (e.g., no downlink symbols or static flexible symbols within the configured uplink resource). In some aspects, the uplink slot may be an uplink slot dynamically indicated (e.g., by the base station 110) for sending deferred SPS HARQ bits. For example, the uplink slot may be a configured uplink slot associated with a codebook (e.g., a type 3 HARQ codebook or an enhanced type 3 HARQ codebook), triggered by DCI (e.g., DCI format 1_1 or DCI format 1_2) received from the base station 110, for one shot collection of the deferred HARQ bits (e.g., a one shot feedback request for deferred/cancelled HARQ-ACK/NACK feedback). In this case, the base station 110 may transmit, to the UE 120, the DCI that dynamically triggers the codebook and the slot for sending the codebook may be scheduled by the DCI. In some aspects, the codebook (e.g., type 3 codebook) may be triggered for one shot collection of the deferred HARQ-feedback for the SPS communications associated with the first and the second priorities.

As further shown in FIG. 5, and by reference number 520, the UE 120 may select, for an available uplink slot (e.g., a next available uplink slot or a dynamically indicated uplink slot), a first subset of HARQ-ACK/NACK feedback associated with the first priority based at least in part on the first subset size parameter (L1), and a second subset of HARQ-ACK/NACK feedback associated with the second priority based at least in part on the second subset size parameter (L2). In some aspects, the first subset may be a first subset of HARQ-ACK/NACK feedback packets selected from the first set of HARQ-ACK/NACK feedback packets associated with the SPS downlink communications having the first priority, and the second subset may be a second subset of HARQ-ACK/NACK feedback packets selected from the second set of HARQ-ACK/NACK feedback packets associated with the SPS downlink communications having the second priority. For example, the UE 120 may select the first subset of HARQ-ACK/NACK feedback packets for the uplink slot by selecting L1 of the first set of HARQ-ACK/NACK feedback packets stored in the first buffer, and the UE 120 may select the second subset of HARQ-ACK/NACK feedback packets for the uplink slot by selecting L2 of the second subset of HARQ-ACK/NACK feedback packets stored in the second buffer.

In some aspects, if there are fewer than L1 HARQ-ACK/NACK feedback packets in the first buffer, the UE 120 may select all of the remaining HARQ-ACK/NACK feedback packets in the first buffer for the first subset of HARQ-ACK/NACK feedback packets. In some aspects, if there are fewer than L2 HARQ-ACK/NACK feedback packets in the second buffer, the UE 120 may select all of the remaining HARQ-ACK/NACK feedback packets in the second buffer for the second subset of HARQ-ACK/NACK feedback packets.

As further shown in FIG. 5, and by reference number 525, the UE 120 may transmit, to the base station 110 in the available uplink slot (e.g., a next available uplink slot or a dynamically indicated uplink slot), at least one of the first subset of HARQ-ACK/NACK feedback or the second subset of HARQ-ACK/NACK feedback. A first uplink resource (e.g., a PUCCH resource) may be configured for the UE 120 to transmit HARQ-ACK/NACK feedback for SPS downlink communications associated with the first priority (e.g., high priority HARQ-ACK/NACK feedback), and a second uplink resource (e.g., a PUCCH resource) may be configured for the UE 120 to transmit HARQ-ACK/NACK feedback for SPS downlink communications associated with the second priority (e.g., low priority HARQ-ACK/NACK feedback).

The UE 120 may determine whether the first uplink resource and the second uplink resource overlap in the time domain. In some aspects, based at least in part on a determination that the first uplink resource and the second uplink resource do not overlap in the time domain, the UE 120 may transmit both the first subset of HARQ-ACK/NACK feedback packets and the second set of HARQ-ACK/NACK feedback packets to the base station 110 in the uplink slot. For example, the UE 120 may transmit the first set of HARQ-ACK/NACK feedback packets to the base station 110 using the first uplink resource, and the UE 120 may transmit the second subset of HARQ-ACK/NACK feedback packets to the base station 110 using the second uplink resource.

In some aspects, based at least in part on a determination that the first uplink resource and the second uplink resource at least partially overlap in the time domain, the UE 120 may defer the second subset of HARQ-ACK/NACK feedback packets (e.g., the low priority HARQ-ACK/NACK feedback) until a next available uplink slot. In this case, the UE 120 may transmit the first subset of HARQ-ACK/NACK feedback parameters (e.g., the high priority HARQ-ACK/NACK feedback) in the current uplink slot using the first uplink resource.

In some aspects, based at least in part on a determination that the first uplink resource and the second uplink resource at least partially overlap in the time domain, the UE 120 may drop the second subset of HARQ-ACK/NACK feedback packets (e.g., the low priority HARQ-ACK/NACK feedback). In this case, the UE 120 may transmit the first subset of HARQ-ACK/NACK feedback parameters (e.g., the high priority HARQ-ACK/NACK feedback) in the current uplink slot using the first uplink resource.

In some aspects, based at least in part on a determination that the first uplink resource and the second uplink resource at least partially overlap in the time domain, the UE 120 may multiplex the second subset of HARQ-ACK/NACK feedback packets (e.g., the low priority HARQ-ACK/NACK feedback) with the first subset of HARQ-ACK/NACK feedback packets (e.g., the high priority HARQ-ACK/NACK feedback) on the first uplink resource. The UE 120 may then transmit the multiplexed first and second subsets of HARQ-ACK/NACK feedback packets to the base station 110 using the first uplink resource in the uplink slot. In some aspects, the UE 120 may perform compression on the second subset of HARQ-ACK/NACK feedback packets prior to multiplexing the second subset of HARQ-ACK/NACK feedback packets with the first subset of HARQ-ACK/NACK feedback packets on the first uplink resource. In some aspects, the UE 120 may multiplex the second subset of HARQ-ACK/NACK feedback packets with the first subset of HARQ-ACK/NACK feedback packets on the first uplink resource without performing compression.

In some aspects, the UE 120 may receive, from the base station 110, an indication of an action to perform in connection with a determination that the first uplink resource and the second uplink resource at least partially overlap in the time domain. For example, the indication of the action to perform may be transmitted to the UE 120 from the base station 110 in an RRC communication, a MAC-CE, or DCI. In some aspects, the indication of the action to perform may be included in at least one SPS configuration. In some aspects, the indication of the action to perform may be indicated and/or updated in a communication (e.g., RRC, MAC-CE, or DCI) separate from an SPS configuration. In some aspects, the indication may indicate that the UE 120 is to defer the second subset of HARQ-ACK/NACK feedback packets, drop the second subset of HARQ-ACK/NACK feedback packets, or multiplex the second subset of HARQ-ACK/NACK feedback packets with the first subset of HARQ-ACK/NACK feedback packets on the first uplink resource, in connection with a determination that the first uplink resource and the second uplink resource at least partially overlap in the time domain. In this case, when the UE 120 determines that the first uplink resource and the second uplink resource at least partially overlap in the time domain, the UE 120 may perform the action indicated in the indication received from the base station 110.

As described above in connection with FIG. 5, the UE 120 may receive an indication of a first subset size parameter associated with a first priority (e.g., a high priority) and an indication of a second subset size parameter associated a second priority (e.g., a low priority). The UE 120 may determine a first set of HARQ-ACK/NACK feedback packets associated with SPS downlink communications having the first priority and a second set of HARQ-ACK/NACK feedback associated with SPS downlink communications having the second priority. The UE may select, for an uplink slot, a first subset of HARQ-ACK/NACK feedback packets from the first set of HARQ-ACK/NACK feedback packets based at least in part on the first subset size parameter, and a second subset of HARQ-ACK/NACK feedback packets from the second set of HARQ-ACK/NACK feedback packets based at least in part on the second subset size parameter. The UE may transmit, during the uplink slot, at least one of the first subset of HARQ-ACK/NACK feedback packets or the second subset of HARQ-ACK/NACK feedback packets. The UE may determine whether to transmit only the first subset of HARQ-ACK/NACK feedback packets, or the first subset of HARQ-ACK/NACK feedback packets and the second subset of HARQ-ACK/NACK feedback packets, based at least in part on a determination of whether a first uplink resource for the first subset of HARQ-ACK/NACK feedback packets and a second uplink resource for the second set of HARQ-ACK/NACK feedback packets overlap in the uplink time slot. As a result, the UE may be enabled to handle different priority levels for deferred HARQ feedback reporting. This may enable the UE to transmit different quantities of HARQ-ACK/NACK feedback packets for different SPS configuration priorities and ensure that the HARQ-ACK/NACK feedback packets are transmitted on uplink resources that are associated with the correct priority levels. Moreover, this may enable the UE to ensure that both high priority HARQ-ACK/NACK feedback and low priority HARQ-ACK/NACK feedback are properly transmitted to the base station. As a result, reliability of deferred HARQ-ACK/NACK feedback may be increased and the base station may not trigger unnecessary retransmissions of the downlink SPS communications, thereby conserving resources that would have otherwise been used retransmitting the downlink SPS communications.

As indicated above, FIG. 5 is provided as an example. Other examples may differ from what is described with respect to FIG. 5.

Figure 6:
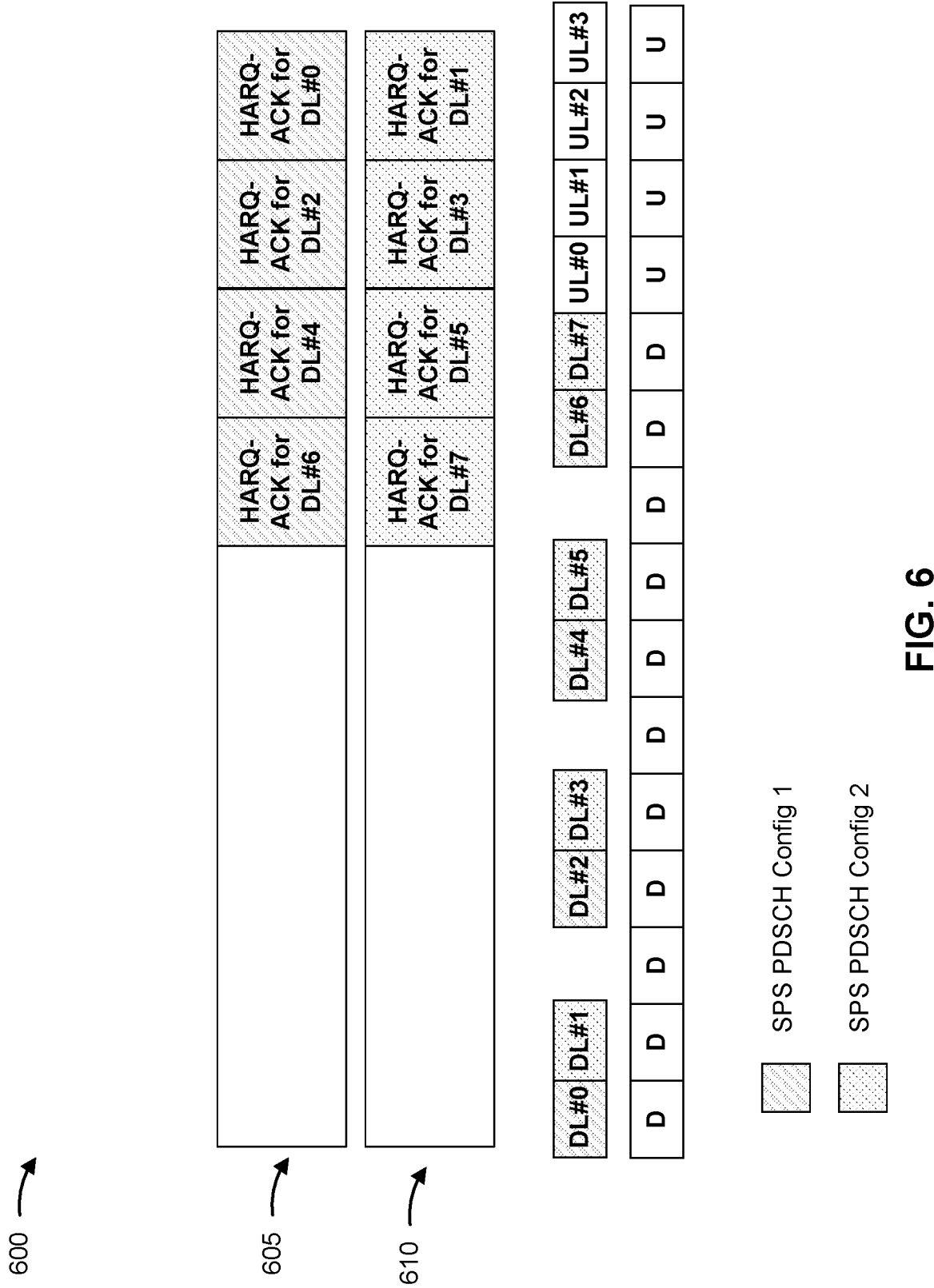

FIG. 6 is a diagram illustrating an example 600 associated with transmission of different numbers of HARQ feedback packets for different SPS configuration priorities, in accordance with the present disclosure.

As shown in FIG. 6, a first SPS PDSCH configuration ("SPS PDSCH Config 1") may be associated with a high priority, and a second SPS configuration ("SPS PDSCH Config 2") may be associated with a low priority. High priority PDSCH communications DL #0, DL #2, DL #4, and DL #6 and low priority PDSCH communications DL #1, DL #3, DL #5, and DL #7 are transmitted to a UE from a base station. The UE may defer the HARQ-ACK/NACK feedback packets for the high priority PDSCH communications and the low priority PDSCH communications until there is an available uplink slot. As shown in FIG. 6, the UE may store the high priority HARQ-ACK/NACK feedback packets in a high priority buffer 605 and store the low priority HARQ-ACK/NACK feedback packets in a low priority buffer 610. When there is an available uplink slot, the UE may select L1 HARQ-ACK/NACK feedback packets from the high priority buffer 605 to be transmitted to the base station using a first uplink resource in the uplink slot (e.g., UL #0), and the UE may select L2 HARQ-ACK/NACK feedback packets from the low priority buffer 610 to be transmitted to the base station using a second uplink resource in the uplink slot (e.g., UL #0). In some aspects, if the UE determines that the first uplink resource and the second uplink resource overlap in the time domain in the uplink slot, the UE may defer the L2 HARQ-ACK/NACK feedback packets selected from the low priority buffer 610 to the next uplink slot (e.g., UL #1), the UE may drop the L2 HARQ-ACK/NACK feedback packets selected from the low priority buffer 610, or the UE may multiplex the L2 HARQ-ACK/NACK feedback packets selected from the low priority buffer 610 with the L1 HARQ-ACK/NACK feedback packets selected from the high priority buffer 605 on the first uplink resource.

As indicated above, FIG. 6 is provided as an example. Other examples may differ from what is described with respect to FIG. 6.

Figure 7:
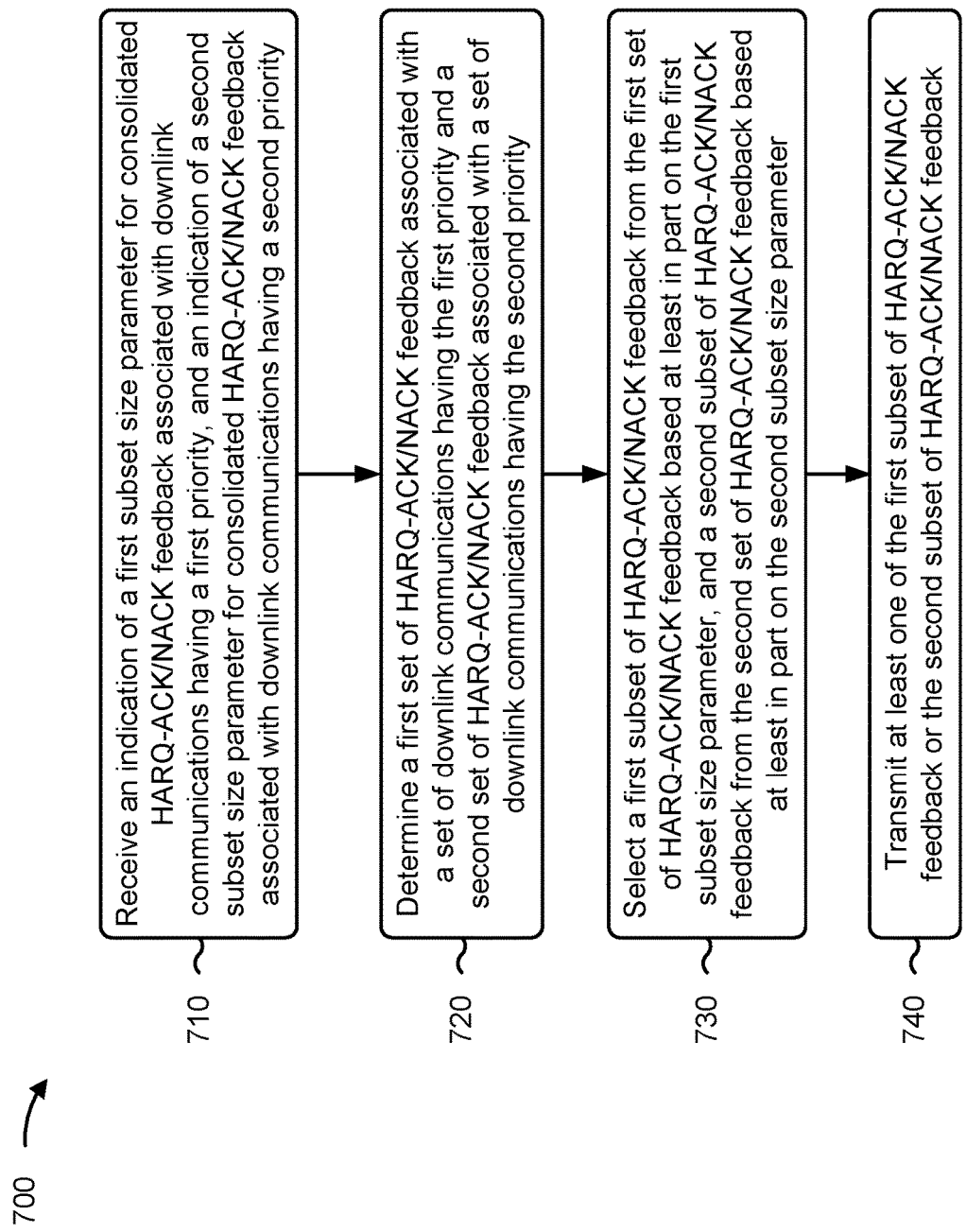
FIGS. 7-8 are diagrams illustrating example processes associated with transmission of different numbers of HARQ feedback packets for different SPS configuration priorities, in accordance with the present disclosure.

FIG. 7 is a diagram illustrating an example process 700 performed, for example, by a UE, in accordance with the present disclosure. Example process 700 is an example where the UE (e.g., UE 120) performs operations associated with transmission of different numbers of HARQ-ACK/NACK packets for different SPS configuration priorities.

As shown in FIG. 7, in some aspects, process 700 may include receiving an indication of a first subset size parameter for HARQ-ACK/NACK feedback associated with downlink communications having a first priority, and an indication of a second subset size parameter for consolidated HARQ-ACK/NACK feedback associated with downlink communications having a second priority (block 710). For example, the UE (e.g., using reception component 902, depicted in FIG. 9) may receive an indication of a first subset size parameter for consolidated HARQ-ACK/NACK feedback associated with downlink communications having a first priority, and an indication of a second subset size parameter for consolidated HARQ-ACK/NACK feedback associated with downlink communications having a second priority, as described above, for example, with reference to FIGS. 5 and/or 6.

As further shown in FIG. 7, in some aspects, process 700 may include determining a first set of HARQ-ACK/NACK feedback associated with a set of downlink communications having the first priority and a second set of HARQ-ACK/NACK feedback associated with a set of downlink communications having the second priority (block 720). For example, the UE (e.g., using determination component 908, depicted in FIG. 9) may determine a first set of HARQ-ACK/NACK feedback associated with a set of downlink communications having the first priority and a second set of HARQ-ACK/NACK feedback associated with a set of downlink communications having the second priority, as described above, for example, with reference to FIGS. 5 and/or 6.

As further shown in FIG. 7, in some aspects, process 700 may include selecting, for an uplink slot, a first subset of HARQ-ACK/NACK feedback from the first set of HARQ-ACK/NACK feedback based at least in part on the first subset size parameter, and a second subset of HARQ-ACK/NACK feedback from the second set of HARQ-ACK/NACK feedback based at least in part on the second subset size parameter (block 730). For example, the UE (e.g., using selection component 910, depicted in FIG. 9) may select, for an uplink slot, a first subset of HARQ-ACK/NACK feedback from the first set of HARQ-ACK/NACK feedback based at least in part on the first subset size parameter, and a second subset of HARQ-ACK/NACK feedback from the second set of HARQ-ACK/NACK feedback based at least in part on the second subset size parameter, as described above, for example, with reference to FIGS. 5 and/or 6.

As further shown in FIG. 7, in some aspects, process 700 may include transmitting, during the uplink slot, at least one of the first subset of HARQ-ACK/NACK feedback or the second subset of HARQ-ACK/NACK feedback (block 740). For example, the UE (e.g., using transmission component 904, depicted in FIG. 9) may transmit, during the uplink slot, at least one of the first subset of HARQ-ACK/NACK feedback or the second subset of HARQ-ACK/NACK feedback, as described above, for example, with reference to FIGS. 5 and/or 6.

Process 700 may include additional aspects, such as any single aspect or any combination of aspects described below and/or in connection with one or more other processes described elsewhere herein.

In a first aspect, the indication of the first subset size parameter is included in at least one semi-persistent scheduling (SPS) physical downlink shared channel (PDSCH) configuration associated with the first priority, and the indication of the second subset size parameter is included in at least one SPS PDSCH configuration associated with the second priority.

In a second aspect, alone or in combination with the first aspect, the indication of the first subset size parameter and the indication of the second subset size parameter are included in at least one of a radio resource control (RRC) communication, a medium access control (MAC) control element, or downlink control information (DCI).

In a third aspect, alone or in combination with one or more of the first and second aspects, process 700 includes storing the first set of HARQ-ACK/NACK feedback associated with the set of downlink communications having the first priority in a first buffer, and storing the second set of HARQ-ACK/NACK feedback associated with the set of downlink communications having the second priority in a second buffer.

In a fourth aspect, alone or in combination with one or more of the first through third aspects, the first subset size parameter indicates a first number of HARQ-ACK/NACK feedback packets and the second subset size parameter indicates a second number of HARQ-ACK/NACK packets, and selecting the first subset of HARQ-ACK/NACK feedback and the second subset of HARQ-ACK/NACK feedback comprises selecting the first number of HARQ-ACK/NACK feedback packets from the first set of HARQ-ACK/NACK feedback stored in the first buffer, and selecting the second number of HARQ-ACK/NACK feedback packets from the second set of HARQ-ACK/NACK feedback stored in the second buffer.

In a fifth aspect, alone or in combination with one or more of the first through fourth aspects, process 700 includes receiving a configuration indicating a first uplink resource for the first subset of HARQ-ACK/NACK feedback and a second uplink resource for the second subset of HARQ-ACK/NACK feedback.

In a sixth aspect, alone or in combination with one or more of the first through fifth aspects, the first uplink resource is a first physical uplink control channel (PUCCH) resource, and the second uplink resource is a second PUCCH resource.

In a seventh aspect, alone or in combination with one or more of the first through sixth aspects, transmitting, during the uplink slot, at least one of the first subset of HARQ-ACK/NACK feedback or the second subset of HARQ-ACK/NACK feedback comprises, based at least in part on a determination that the first uplink resource and the second uplink resource do not overlap in a time domain, transmitting the first subset of HARQ-ACK/NACK feedback in the uplink slot using the first uplink resource, and transmitting the second subset of HARQ-ACK/NACK feedback in the uplink slot using the second uplink resource.

In an eighth aspect, alone or in combination with one or more of the first through seventh aspects, transmitting, during the uplink slot, at least one of the first subset of HARQ-ACK/NACK feedback or the second subset of HARQ-ACK/NACK feedback comprises, based at least in part on a determination that the first uplink resource and the second uplink resource at least partially overlap in a time domain, transmitting the first subset of HARQ-ACK/NACK feedback in the uplink slot using the first uplink resource, and deferring the second subset of HARQ-ACK/NACK feedback to a subsequent uplink slot.

In a ninth aspect, alone or in combination with one or more of the first through eighth aspects, transmitting, during the uplink slot, at least one of the first subset of HARQ-ACK/NACK feedback or the second subset of HARQ-ACK/NACK feedback comprises, based at least in part on a determination that the first uplink resource and the second uplink resource at least partially overlap in a time domain, transmitting the first subset of HARQ-ACK/NACK feedback in the uplink slot using the first uplink resource, and dropping the second subset of HARQ-ACK/NACK feedback.

In a tenth aspect, alone or in combination with one or more of the first through ninth aspects, transmitting, during the uplink slot, at least one of the first subset of HARQ-ACK/NACK feedback or the second subset of HARQ-ACK/NACK feedback comprises, based at least in part on a determination that the first uplink resource and the second uplink resource at least partially overlap in a time domain, multiplexing the second subset of HARQ-ACK/NACK feedback with the first subset of HARQ-ACK/NACK feedback on the first uplink resource in the uplink slot.

In an eleventh aspect, alone or in combination with one or more of the first through tenth aspects, transmitting, during the uplink slot, at least one of the first subset of HARQ-ACK/NACK feedback or the second subset of HARQ-ACK/NACK feedback further comprises compressing the second subset of HARQ-ACK/NACK feedback prior to multiplexing the second subset of HARQ-ACK/NACK feedback with the first subset of HARQ-ACK/NACK feedback on the first uplink resource.

In a twelfth aspect, alone or in combination with one or more of the first through eleventh aspects, process 700 includes receiving, from a base station, an indication of an action to be performed by the UE in connection with a determination that the first uplink resource and the second uplink resource at least partially overlap in a time domain.

In a thirteenth aspect, alone or in combination with one or more of the first through twelfth aspects, receiving the indication of the action to be performed by the UE comprises receiving the indication of the action to be performed by the UE via an RRC communication, a MAC control element, or DCI.

In a fourteenth aspect, alone or in combination with one or more of the first through thirteenth aspects, the action to be performed by the UE in connection with a determination that the first uplink resource and the second uplink resource at least partially overlap in a time domain includes deferring the second subset of HARQ-ACK/NACK feedback to a subsequent uplink slot, dropping the second subset of HARQ-ACK/NACK feedback, or multiplexing the second subset of HARQ-ACK/NACK feedback with the first subset of HARQ-ACK/NACK feedback on the first uplink resource.

In a fifteenth aspect, alone or in combination with one or more of the first through fourteenth aspects, process 700 includes receiving the set of downlink communications associated with the first priority during a first set of SPS downlink occasions, and receiving the set of downlink communications associated with the second priority during a second set of SPS downlink occasions.

In a sixteenth aspect, alone or in combination with one or more of the first through fifteenth aspects, the first subset size parameter indicates a maximum number of HARQ-ACK/NACK feedback packets for the first subset of HARQ-ACK/NACK feedback, and the second subset size parameter indicates a maximum number of HARQ-ACK/NACK feedback packets for the second subset of HARQ-ACK/NACK feedback.

In a seventeenth aspect, alone or in combination with one or more of the first through sixteenth aspects, the first subset of HARQ-ACK/NACK feedback includes a respective HARQ-ACK feedback packet for each HARQ-ACK/NACK feedback in the first subset of HARQ-ACK/NACK feedback, and the second subset of HARQ-ACK/NACK feedback includes a respective HARQ-ACK feedback packet for each HARQ-ACK/NACK feedback in the second subset of HARQ-ACK/NACK feedback.

In an eighteenth aspect, alone or in combination with one or more of the first through seventeenth aspects, the uplink slot is at least one of a next available uplink slot to send deferred semi-persistent scheduling HARQ-ACK.NACK feedback, or a configured slot associated with a codebook, triggered by DCI received from a base station, for collection of deferred HARQ-ACK/NACK feedback associated with the first priority and the second priority.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
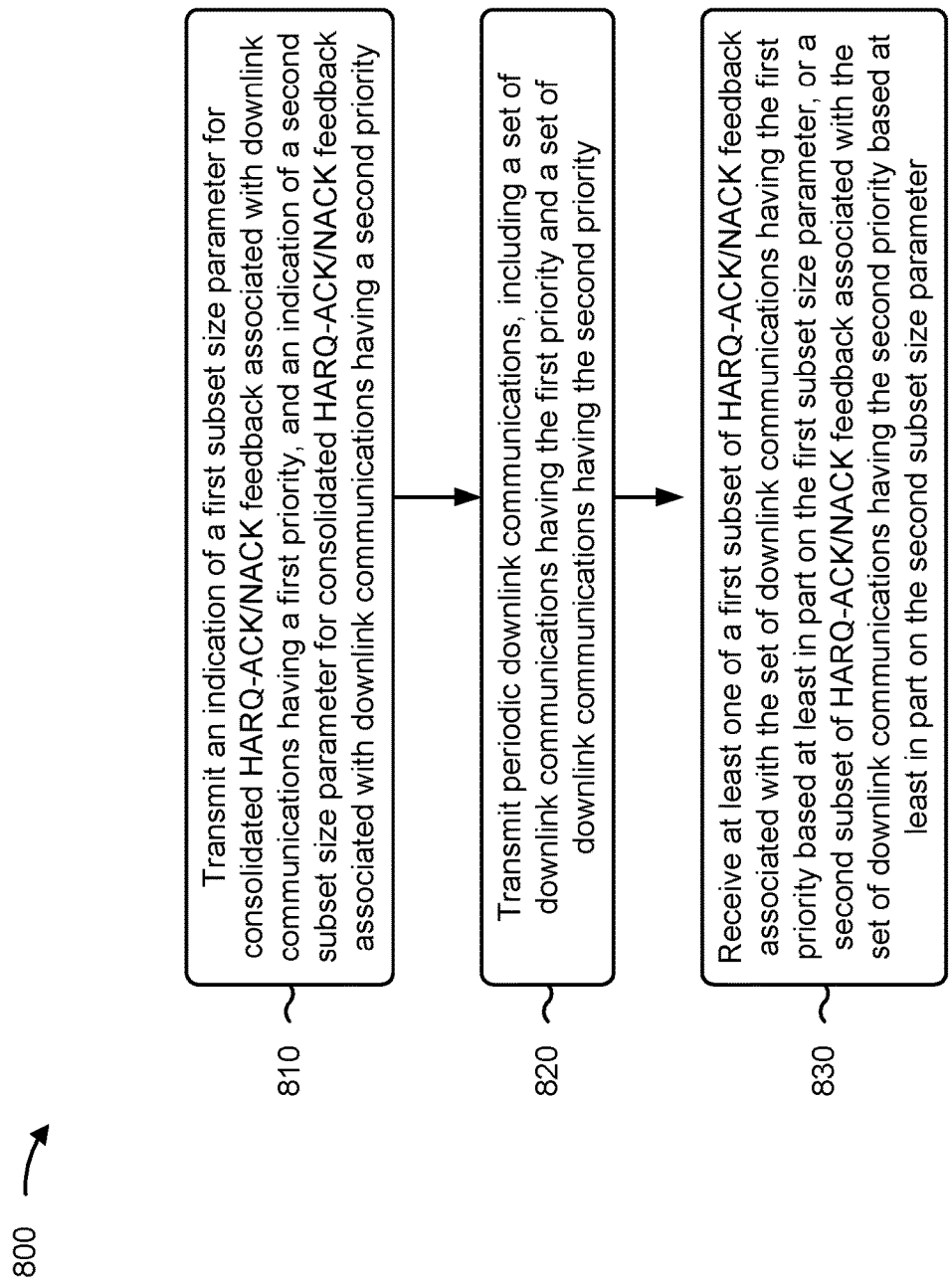

FIG. 8 is a diagram illustrating an example process 800 performed, for example, by a base station, in accordance with the present disclosure. Example process 800 is an example where the base station (e.g., base station 110) performs operations associated with transmission of different numbers of HARQ-ACK/NACK packets for different SPS configuration priorities.

As shown in FIG. 8, in some aspects, process 800 may include transmitting, to a UE, an indication of a first subset size parameter for consolidated HARQ-ACK/NACK feedback associated with downlink communications having a first priority, and an indication of a second subset size parameter for consolidated HARQ-ACK/NACK feedback associated with downlink communications having a second priority (block 810). For example, the base station (e.g., using transmission component 1004, depicted in FIG. 10) may transmit, to a UE, an indication of a first subset size parameter for consolidated HARQ-ACK/NACK feedback associated with downlink communications having a first priority, and an indication of a second subset size parameter for consolidated HARQ-ACK/NACK feedback associated with downlink communications having a second priority, as described above, for example, with reference to FIGS. 5 and/or 6.

As further shown in FIG. 8, in some aspects, process 800 may include transmitting, to the UE, downlink communications, including a set of downlink communications having the first priority and a set of downlink communications having the second priority (block 820). For example, the base station (e.g., using transmission component 1004, depicted in FIG. 10) may transmit, to the UE, downlink communications, including a set of downlink communications having the first priority and a set of downlink communications having the second priority, as described above, for example, with reference to FIGS. 5 and/or 6.

As further shown in FIG. 8, in some aspects, process 800 may include receiving, from the UE during an uplink slot, at least one of a first subset of HARQ-ACK/NACK feedback associated with the set of downlink communications having the first priority based at least in part on the first subset size parameter, or a second subset of HARQ-ACK/NACK feedback associated with the set of downlink communications having the second priority based at least in part on the second subset size parameter (block 830). For example, the base station (e.g., using reception component 1002, depicted in FIG. 10) may receive, from the UE during an uplink slot, at least one of a first subset of HARQ-ACK/NACK feedback associated with the set of downlink communications having the first priority based at least in part on the first subset size parameter, and a second subset of HARQ-ACK/NACK feedback associated with the set of downlink communications having the second priority based at least in part on the second subset size parameter, as described above, for example, with reference to FIGS. 5 and/or 6.

Process 800 may include additional aspects, such as any single aspect or any combination of aspects described below and/or in connection with one or more other processes described elsewhere herein.

In a first aspect, the indication of the first subset size parameter is included in at least one SPS PDSCH configuration associated with the first priority, and the indication of the second subset size parameter is included in at least one SPS PDSCH configuration associated with the second priority.

In a second aspect, alone or in combination with the first aspect, the indication of the first subset size parameter and the indication of the second subset size parameter are included in at least one of an RRC communication, a MAC control element, or DCI.

In a third aspect, alone or in combination with one or more of the first and second aspects, the first subset size parameter indicates a first number of HARQ-ACK/NACK feedback packets and the second subset size parameter indicates a second number of HARQ-ACK/NACK packets.

In a fourth aspect, alone or in combination with one or more of the first through third aspects, process 800 includes transmitting, to the UE, a configuration indicating a first uplink resource for the first subset of HARQ-ACK/NACK feedback and a second uplink resource for the second subset of HARQ-ACK/NACK feedback.

In a fifth aspect, alone or in combination with one or more of the first through fourth aspects, the first uplink resource is a first PUCCH resource, and the second uplink resource is a second PUCCH resource.

In a sixth aspect, alone or in combination with one or more of the first through fifth aspects, receiving, from the UE during the uplink slot, at least one of the first subset of HARQ-ACK/NACK feedback or the second subset of HARQ-ACK/NACK feedback comprises receiving the first subset of HARQ-ACK/NACK feedback in the uplink slot on the first uplink resource, and receiving the second subset of HARQ-ACK/NACK feedback in the uplink slot on the second uplink resource.

In a seventh aspect, alone or in combination with one or more of the first through sixth aspects, receiving, from the UE during the uplink slot, at least one of the first subset of HARQ-ACK/NACK feedback or the second subset of HARQ-ACK/NACK feedback comprises receiving the first subset of HARQ-ACK/NACK feedback in the uplink slot using the first uplink resource.

In an eighth aspect, alone or in combination with one or more of the first through seventh aspects, the second subset of HARQ-ACK/NACK feedback is deferred to a subsequent uplink slot.

In a ninth aspect, alone or in combination with one or more of the first through eighth aspects, receiving, from the UE during the uplink slot, at least one of the first subset of HARQ-ACK/NACK feedback or the second subset of HARQ-ACK/NACK feedback comprises receiving the second subset of HARQ-ACK/NACK feedback multiplexed with the first subset of HARQ-ACK/NACK feedback on the first uplink resource in the uplink slot.

In a tenth aspect, alone or in combination with one or more of the first through ninth aspects, process 800 includes transmitting, to the UE, an indication of an action to be performed by the UE in connection with a determination that the first uplink resource and the second uplink resource at least partially overlap in a time domain.

In an eleventh aspect, alone or in combination with one or more of the first through tenth aspects, transmitting the indication of the action to be performed by the UE comprises transmitting the indication of the action to be performed by the UE via an RRC communication, a MAC control element, or DCI.

In a twelfth aspect, alone or in combination with one or more of the first through eleventh aspects, the action to be performed by the UE in connection with a determination that the first uplink resource and the second uplink resource at least partially overlap in a time domain includes deferring the second subset of HARQ-ACK/NACK feedback to a subsequent uplink slot, dropping the second subset of HARQ-ACK/NACK feedback, or multiplexing the second subset of HARQ-ACK/NACK feedback with the first subset of HARQ-ACK/NACK feedback on the first uplink resource.

In a thirteenth aspect, alone or in combination with one or more of the first through twelfth aspects, process 800 includes transmitting, to the UE, the set of downlink communications associated with the first priority during a first set of SPS downlink occasions, and transmitting, to the UE, the set of downlink communications associated with the second priority during a second set of SPS downlink occasions.

In a fourteenth aspect, alone or in combination with one or more of the first through thirteenth aspects, the first subset size parameter indicates a maximum number of HARQ-ACK/NACK feedback packets for the first subset of HARQ-ACK/NACK feedback, and the second subset size parameter indicates a maximum number of HARQ-ACK/NACK feedback packets for the second subset of HARQ-ACK/NACK feedback.

In a fifteenth aspect, alone or in combination with one or more of the first through fourteenth aspects, the first subset of HARQ-ACK/NACK feedback includes a respective HARQ-ACK feedback packet for each HARQ-ACK/NACK feedback in the first subset of HARQ-ACK/NACK feedback, and the second subset of HARQ-ACK/NACK feedback includes a respective HARQ-ACK feedback packet for each HARQ-ACK/NACK feedback in the second subset of HARQ-ACK/NACK feedback.

In sixteenth aspect, alone or in combination with one or more of the first through fifteenth aspects, the uplink slot is at least one of a next available uplink slot to send deferred semi-persistent scheduling HARQ-ACK.NACK feedback, or a configured slot associated with a codebook, triggered by DCI received from a base station, for collection of deferred HARQ-ACK/NACK feedback associated with the first priority and the second priority.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
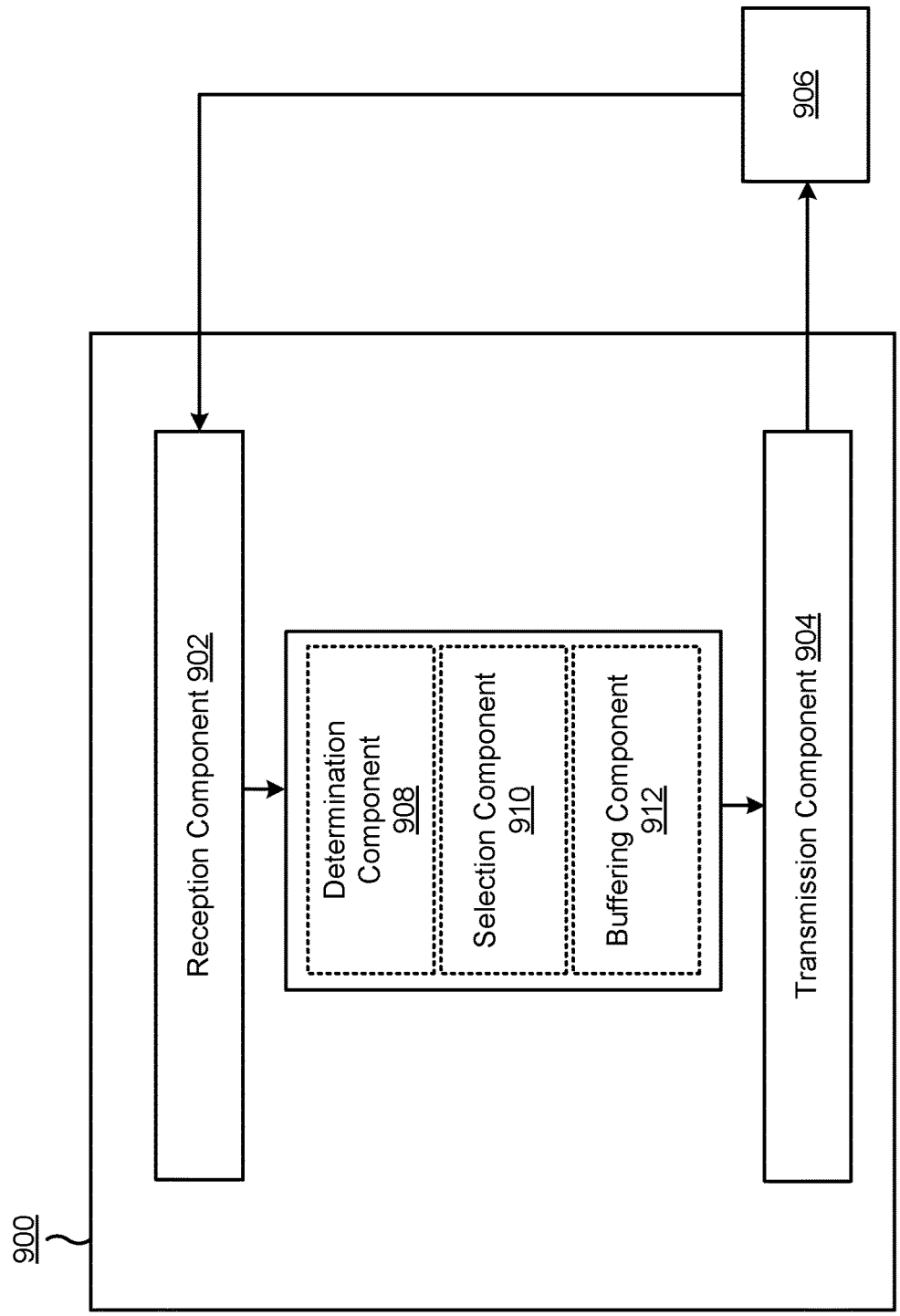
FIGS. 9-10 are block diagrams of example apparatuses for wireless communication, in accordance with the present disclosure.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include one or more of a determination component 908, a selection component 910, or a buffering component 912, among other examples.

In some aspects, the apparatus 900 may be configured to perform one or more operations described herein in connection with FIGS. 5-6. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be collocated with the reception component 902 in a transceiver.

The reception component 902 may receive an indication of a first subset size parameter for consolidated HARQ-ACK/NACK feedback associated with downlink communications having a first priority, and an indication of a second subset size parameter for consolidated HARQ-ACK/NACK feedback associated with downlink communications having a second priority. The determination component 908 may determine a first set of HARQ-ACK/NACK feedback associated with a set of downlink communications having the first priority and a second set of HARQ-ACK/NACK feedback associated with a set of downlink communications having the second priority. In some aspects, the determination component 908 may include a controller/processor, a memory, or a combination thereof, of the UE described above in connection with FIG. 2. The selection component 910 may select, for an uplink slot, a first subset of HARQ-ACK/NACK feedback from the first set of HARQ-ACK/NACK feedback based at least in part on the first subset size parameter, and a second subset of HARQ-ACK/NACK feedback from the second set of HARQ-ACK/NACK feedback based at least in part on the second subset size parameter. In some aspects, the selection component 910 may include a controller/processor, a memory, or a combination thereof, of the UE described above in connection with FIG. 2. The transmission component 904 may transmit, during the uplink slot, at least one of the first subset of HARQ-ACK/NACK feedback or the second subset of HARQ-ACK/NACK feedback.

The buffering component 912 may store the first set of HARQ-ACK/NACK feedback associated with the set of downlink communications having the first priority in a first buffer. In some aspects, the buffering component 912 may include a controller/processor, a memory, or a combination thereof, of the UE described above in connection with FIG. 2.

The buffering component 912 may store the second set of HARQ-ACK/NACK feedback associated with the set of downlink communications having the second priority in a second buffer.

The reception component 902 may receive a configuration indicating a first uplink resource for the first subset of HARQ-ACK/NACK feedback and a second uplink resource for the second subset of HARQ-ACK/NACK feedback.

The reception component 902 may receive, from a base station, an indication of an action to be performed by the UE in connection with a determination that the first uplink resource and the second uplink resource at least partially overlap in a time domain.

The reception component 902 may receive the set of downlink communications associated with the first priority during a first set of SPS downlink occasions.

The reception component 902 may receive the set of downlink communications associated with the second priority during a second set of SPS downlink occasions.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
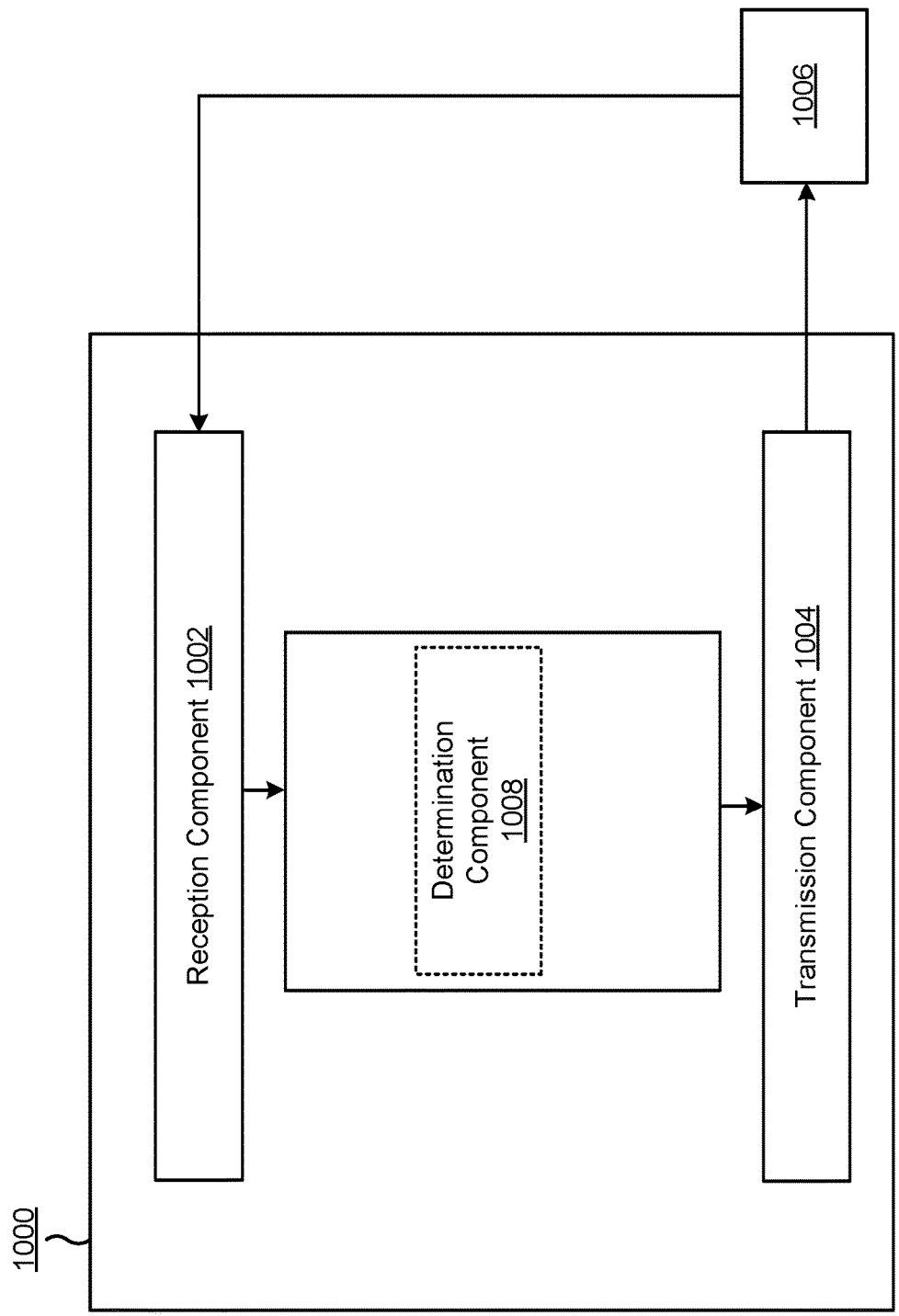

FIG. 10 is a block diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a determination component 1008, among other examples.

In some aspects, the apparatus 1000 may be configured to perform one or more operations described herein in connection with FIGS. 5-6. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the base station described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the base station described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the base station described above in connection with FIG. 2. In some aspects, the transmission component 1004 may be collocated with the reception component 1002 in a transceiver.

The transmission component 1004 may transmit, to a UE, an indication of a first subset size parameter for consolidated HARQ-ACK/NACK feedback associated with downlink communications having a first priority, and an indication of a second subset size parameter for consolidated HARQ-ACK/NACK feedback associated with downlink communications having a second priority. The transmission component 1004 may transmit, to the UE, downlink communications, including a set of downlink communications having the first priority and a set of downlink communications having the second priority. The reception component 1002 may receive, from the UE during an uplink slot, at least one of a first subset of HARQ-ACK/NACK feedback associated with the set of downlink communications having the first priority based at least in part on the first subset size parameter, and a second subset of HARQ-ACK/NACK feedback associated with the set of downlink communications having the second priority based at least in part on the second subset size parameter.

The determination component 1008 may determine the first subset size parameter and the second subset size parameter. In some aspects, the determination component 1008 may include a controller/processor, a memory, or a combination thereof, of the UE described above in connection with FIG. 2.

The transmission component 1004 may transmit, to the UE, a configuration indicating a first uplink resource for the first subset of HARQ-ACK/NACK feedback and a second uplink resource for the second subset of HARQ-ACK/NACK feedback.

The transmission component 1004 may transmit, to the UE, an indication of an action to be performed by the UE in connection with a determination that the first uplink resource and the second uplink resource at least partially overlap in a time domain.

The transmission component 1004 may transmit, to the UE, the set of downlink communications associated with the first priority during a first set of SPS downlink occasions.

The transmission component 1004 may transmit, to the UE, the set of downlink communications associated with the second priority during a second set of SPS downlink occasions.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving an indication of a first subset size parameter for consolidated hybrid automatic repeat request (HARQ) acknowledgment or negative acknowledgment (HARQ-ACK/NACK) feedback associated with downlink communications having a first priority, and an indication of a second subset size parameter for consolidated HARQ-ACK/NACK feedback associated with downlink communications having a second priority; determining a first set of HARQ-ACK/NACK feedback associated with a set of downlink communications having the first priority and a second set of HARQ-ACK/NACK feedback associated with a set of downlink communications having the second priority; selecting, for an uplink slot, a first subset of HARQ-ACK/NACK feedback from the first set of HARQ-ACK/NACK feedback based at least in part on the first subset size parameter, and a second subset of HARQ-ACK/NACK feedback from the second set of HARQ-ACK/NACK feedback based at least in part on the second subset size parameter; and transmitting, during the uplink slot, at least one of the first subset of HARQ-ACK/NACK feedback or the second subset of HARQ-ACK/NACK feedback.

Aspect 2: The method of Aspect 1, wherein the indication of the first subset size parameter is included in at least one semi-persistent scheduling (SPS) physical downlink shared channel (PDSCH) configuration associated with the first priority, and the indication of the second subset size parameter is included in at least one SPS PDSCH configuration associated with the second priority.

Aspect 3: The method of any of Aspects 1-2, wherein the indication of the first subset size parameter and the indication of the second subset size parameter are included in at least one of: a radio resource control (RRC) communication, a medium access control (MAC) control element, or downlink control information (DCI).

Aspect 4: The method of any of Aspects 1-3, further comprising: storing the first set of HARQ-ACK/NACK feedback associated with the set of downlink communications having the first priority in a first buffer; and storing the second set of HARQ-ACK/NACK feedback associated with the set of downlink communications having the second priority in a second buffer.

Aspect 5: The method of Aspect 4, wherein the first subset size parameter indicates a first number of HARQ-ACK/NACK feedback packets and the second subset size parameter indicates a second number of HARQ-ACK/NACK packets, and wherein selecting the first subset of HARQ-ACK/NACK feedback and the second subset of HARQ-ACK/NACK feedback comprises: selecting the first number of HARQ-ACK/NACK feedback packets from the first set of HARQ-ACK/NACK feedback stored in the first buffer; and selecting the second number of HARQ-ACK/NACK feedback packets from the second set of HARQ-ACK/NACK feedback stored in the second buffer.

Aspect 6: The method of any of Aspects 1-5, further comprising: receiving a configuration indicating a first uplink resource for the first subset of HARQ-ACK/NACK feedback and a second uplink resource for the second subset of HARQ-ACK/NACK feedback.

Aspect 7: The method of Aspect 6, wherein the first uplink resource is a first physical uplink control channel (PUCCH) resource, and the second uplink resource is a second PUCCH resource.

Aspect 8: The method of any of Aspects 6-7, wherein transmitting, during the uplink slot, at least one of the first subset of HARQ-ACK/NACK feedback or the second subset of HARQ-ACK/NACK feedback comprises: based at least in part on a determination that the first uplink resource and the second uplink resource do not overlap in a time domain transmitting the first subset of HARQ-ACK/NACK feedback in the uplink slot using the first uplink resource; and transmitting the second subset of HARQ-ACK/NACK feedback in the uplink slot using the second uplink resource.

Aspect 9: The method of any of Aspects 6-8, wherein transmitting, during the uplink slot, at least one of the first subset of HARQ-ACK/NACK feedback or the second subset of HARQ-ACK/NACK feedback comprises: based at least in part on a determination that the first uplink resource and the second uplink resource at least partially overlap in a time domain: transmitting the first subset of HARQ-ACK/NACK feedback in the uplink slot using the first uplink resource; and deferring the second subset of HARQ-ACK/NACK feedback to a subsequent uplink slot.

Aspect 10: The method of any of Aspects 6-8, wherein transmitting, during the uplink slot, at least one of the first subset of HARQ-ACK/NACK feedback or the second subset of HARQ-ACK/NACK feedback comprises: based at least in part on a determination that the first uplink resource and the second uplink resource at least partially overlap in a time domain: transmitting the first subset of HARQ-ACK/NACK feedback in the uplink slot using the first uplink resource; and dropping the second subset of HARQ-ACK/NACK feedback.

Aspect 11: The method of any of Aspects 6-8, wherein transmitting, during the uplink slot, at least one of the first subset of HARQ-ACK/NACK feedback or the second subset of HARQ-ACK/NACK feedback comprises: based at least in part on a determination that the first uplink resource and the second uplink resource at least partially overlap in a time domain: multiplexing the second subset of HARQ-ACK/NACK feedback with the first subset of HARQ-ACK/NACK feedback on the first uplink resource in the uplink slot.

Aspect 12: The method of Aspect 11, wherein transmitting, during the uplink slot, at least one of the first subset of HARQ-ACK/NACK feedback or the second subset of HARQ-ACK/NACK feedback further comprises: compressing the second subset of HARQ-ACK/NACK feedback prior to multiplexing the second subset of HARQ-ACK/NACK feedback with the first subset of HARQ-ACK/NACK feedback on the first uplink resource.

Aspect 13: The method of any of Aspects 6-12, further comprising: receiving, from a base station, an indication of an action to be performed by the UE in connection with a determination that the first uplink resource and the second uplink resource at least partially overlap in a time domain.

Aspect 14: The method of Aspect 13, wherein receiving the indication of the action to be performed by the UE comprises: receiving the indication of the action to be performed by the UE via a radio resource control (RRC) communication, a medium access control (MAC) control element, or downlink control information (DCI).

Aspect 15: The method of any of Aspects 13-14, wherein the action to be performed by the UE in connection with a determination that the first uplink resource and the second uplink resource at least partially overlap in a time domain includes: deferring the second subset of HARQ-ACK/NACK feedback to a subsequent uplink slot; dropping the second subset of HARQ-ACK/NACK feedback; or multiplexing the second subset of HARQ-ACK/NACK feedback with the first subset of HARQ-ACK/NACK feedback on the first uplink resource.

Aspect 16: The method of any of Aspects 1-15, further comprising: receiving the set of downlink communications associated with the first priority during a first set of semi-persistent scheduling (SPS) downlink occasions; and receiving the set of downlink communications associated with the second priority during a second set of SPS downlink occasions.

Aspect 17: The method of any of Aspects 1-16, wherein the first subset size parameter indicates a maximum number of HARQ-ACK/NACK feedback packets for the first subset of HARQ-ACK/NACK feedback, and the second subset size parameter indicates a maximum number of HARQ-ACK/NACK feedback packets for the second subset of HARQ-ACK/NACK feedback.

Aspect 18: The method of Aspect 17, wherein the first subset of HARQ-ACK/NACK feedback includes a respective HARQ-ACK feedback packet for each HARQ-ACK/NACK feedback in the first subset of HARQ-ACK/NACK feedback, and wherein the second subset of HARQ-ACK/NACK feedback includes a respective HARQ-ACK feedback packet for each HARQ-ACK/NACK feedback in the second subset of HARQ-ACK/NACK feedback.

Aspect 19: The method of any of Aspects 1-18, wherein the uplink slot is at least one of: a next available uplink slot to send deferred HARQ-ACK.NACK feedback, or a configured slot associated with a codebook, triggered by downlink control information (DCI) received from a base station, for collection of deferred HARQ-ACK/NACK feedback associated with the first priority and the second priority.

Aspect 20: A method of wireless communication performed by a base station, comprising: transmitting, to a user equipment (UE), an indication of a first subset size parameter for consolidated hybrid automatic repeat request (HARQ) acknowledgment or negative acknowledgment (HARQ-ACK/NACK) feedback associated with downlink communications having a first priority, and an indication of a second subset size parameter for consolidated HARQ-ACK/NACK feedback associated with downlink communications having a second priority; transmitting, to the UE, downlink communications, including a set of downlink communications having the first priority and a set of downlink communications having the second priority; and receiving, from the UE during an uplink slot, at least one of a first subset of HARQ-ACK/NACK feedback associated with the set of downlink communications having the first priority based at least in part on the first subset size parameter, or a second subset of HARQ-ACK/NACK feedback associated with the set of downlink communications having the second priority based at least in part on the second subset size parameter.

Aspect 21: The method of Aspect 20, wherein the indication of the first subset size parameter is included in at least one semi-persistent scheduling (SPS) physical downlink shared channel (PDSCH) configuration associated with the first priority, and the indication of the second subset size parameter is included in at least one SPS PDSCH configuration associated with the second priority.

Aspect 22: The method of any of Aspects 20-21, wherein the indication of the first subset size parameter and the indication of the second subset size parameter are included in at least one of: a radio resource control (RRC) communication, a medium access control (MAC) control element, or downlink control information (DCI).

Aspect 23: The method of any of Aspects 20-22, wherein the first subset size parameter indicates a first number of HARQ-ACK/NACK feedback packets and the second subset size parameter indicates a second number of HARQ-ACK/NACK packets.

Aspect 24: The method of any of Aspects 20-23, further comprising: transmitting, to the UE, a configuration indicating a first uplink resource for the first subset of HARQ-ACK/NACK feedback and a second uplink resource for the second subset of HARQ-ACK/NACK feedback.

Aspect 25: The method of Aspect 24, wherein the first uplink resource is a first physical uplink control channel (PUCCH) resource, and the second uplink resource is a second PUCCH resource.

Aspect 26: The method of any of Aspects 24-25, wherein receiving, from the UE during the uplink slot, at least one of the first subset of HARQ-ACK/NACK feedback or the second subset of HARQ-ACK/NACK feedback comprises: receiving the first subset of HARQ-ACK/NACK feedback in the uplink slot on the first uplink resource; and receiving the second subset of HARQ-ACK/NACK feedback in the uplink slot on the second uplink resource.

Aspect 27: The method of any of Aspects 24-26, wherein receiving, from the UE during the uplink slot, at least one of the first subset of HARQ-ACK/NACK feedback or the second subset of HARQ-ACK/NACK feedback comprises: receiving the first subset of HARQ-ACK/NACK feedback in the uplink slot using the first uplink resource.

Aspect 28: The method of Aspect 27, wherein the second subset of HARQ-ACK/NACK feedback is deferred to a subsequent uplink slot.

Aspect 29: The method of any of Aspects 24-25, wherein receiving, from the UE during the uplink slot, at least one of the first subset of HARQ-ACK/NACK feedback or the second subset of HARQ-ACK/NACK feedback comprises: receiving the second subset of HARQ-ACK/NACK feedback multiplexed with the first subset of HARQ-ACK/NACK feedback on the first uplink resource in the uplink slot.

Aspect 30: The method of any of Aspects 24-29, further comprising: transmitting, to the UE, an indication of an action to be performed by the UE in connection with a determination that the first uplink resource and the second uplink resource at least partially overlap in a time domain.

Aspect 31: The method of Aspect 29, wherein transmitting the indication of the action to be performed by the UE comprises: transmitting the indication of the action to be performed by the UE via a radio resource control (RRC) communication, a medium access control (MAC) control element, or downlink control information (DCI).

Aspect 32: The method of any of Aspects 30-31, wherein the action to be performed by the UE in connection with a determination that the first uplink resource and the second uplink resource at least partially overlap in a time domain includes: deferring the second subset of HARQ-ACK/NACK feedback to a subsequent uplink slot; dropping the second subset of HARQ-ACK/NACK feedback; or multiplexing the second subset of HARQ-ACK/NACK feedback with the first subset of HARQ-ACK/NACK feedback on the first uplink resource.

Aspect 33: The method of any of Aspects 20-32, further comprising: transmitting, to the UE, the set of downlink communications associated with the first priority during a first set of semi-persistent scheduling (SPS) downlink occasions; and transmitting, to the UE, the set of downlink communications associated with the second priority during a second set of SPS downlink occasions.

Aspect 34: The method of any of Aspects 20-33, wherein the first subset size parameter indicates a maximum number of HARQ-ACK/NACK feedback packets for the first subset of HARQ-ACK/NACK feedback, and the second subset size parameter indicates a maximum number of HARQ-ACK/NACK feedback packets for the second subset of HARQ-ACK/NACK feedback.

Aspect 35: The method of Aspect 34, wherein the first subset of HARQ-ACK/NACK feedback includes a respective HARQ-ACK feedback packet for each HARQ-ACK/NACK feedback in the first subset of HARQ-ACK/NACK feedback, and wherein the second subset of HARQ-ACK/NACK feedback includes a respective HARQ-ACK feedback packet for each HARQ-ACK/NACK feedback in the second subset of HARQ-ACK/NACK feedback.

Aspect 36: The method of any of Aspects 20-35, wherein the uplink slot is at least one of: a next available uplink slot to send deferred HARQ-ACK.NACK feedback, or a configured slot associated with a codebook, triggered by downlink control information (DCI) received from a base station, for collection of deferred HARQ-ACK/NACK feedback associated with the first priority and the second priority.

Aspect 37: An apparatus for wireless communication at a device, comprising a processor; memory coupled with the processor; and instructions stored in the memory and executable by the processor to cause the apparatus to perform the method of one or more of Aspects 1-19.

Aspect 38: A device for wireless communication, comprising a memory and one or more processors coupled to the memory, the one or more processors configured to perform the method of one or more of Aspects 1-19.

Aspect 39: An apparatus for wireless communication, comprising at least one means for performing the method of one or more of Aspects 1-19.

Aspect 40: A non-transitory computer-readable medium storing code for wireless communication, the code comprising instructions executable by a processor to perform the method of one or more of Aspects 1-19.

Aspect 41: A non-transitory computer-readable medium storing a set of instructions for wireless communication, the set of instructions comprising one or more instructions that, when executed by one or more processors of a device, cause the device to perform the method of one or more of Aspects 1-19.

Aspect 42: An apparatus for wireless communication at a device, comprising a processor; memory coupled with the processor; and instructions stored in the memory and executable by the processor to cause the apparatus to perform the method of one or more of Aspects 20-36.

Aspect 43: A device for wireless communication, comprising a memory and one or more processors coupled to the memory, the one or more processors configured to perform the method of one or more of Aspects 20-36.

Aspect 44: An apparatus for wireless communication, comprising at least one means for performing the method of one or more of Aspects 20-36.

Aspect 45: A non-transitory computer-readable medium storing code for wireless communication, the code comprising instructions executable by a processor to perform the method of one or more of Aspects 20-36.

Aspect 46: A non-transitory computer-readable medium storing a set of instructions for wireless communication, the set of instructions comprising one or more instructions that, when executed by one or more processors of a device, cause the device to perform the method of one or more of Aspects 20-36.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving an indication of a first subset size parameter for consolidated hybrid automatic repeat request (HARQ) acknowledgment or negative acknowledgment (HARQ-ACK/NACK) feedback associated with downlink communications having a first priority, and an indication of a second subset size parameter for consolidated HARQ-ACK/NACK feedback associated with downlink communications having a second priority;
   determining a first set of HARQ-ACK/NACK feedback associated with a set of downlink communications having the first priority and a second set of HARQ-ACK/NACK feedback associated with a set of downlink communications having the second priority;
   selecting, for an uplink slot,
      a first subset of HARQ-ACK/NACK feedback from the first set of HARQ-ACK/NACK feedback based at least in part on the first subset size parameter, and
      a second subset of HARQ-ACK/NACK feedback from the second set of HARQ-ACK/NACK feedback based at least in part on the second subset size parameter; and
   transmitting, during the uplink slot, at least one of the first subset of HARQ-ACK/NACK feedback or the second subset of HARQ-ACK/NACK feedback.

2. The method of claim 1, wherein the indication of the first subset size parameter is included in at least one semi-persistent scheduling (SPS) physical downlink shared channel (PDSCH) configuration associated with the first priority, and the indication of the second subset size parameter is included in at least one SPS PDSCH configuration associated with the second priority.

3. The method of claim 1, further comprising:
   storing the first set of HARQ-ACK/NACK feedback associated with the set of downlink communications having the first priority in a first buffer; and
   storing the second set of HARQ-ACK/NACK feedback associated with the set of downlink communications having the second priority in a second buffer.

4. The method of claim 3, wherein the first subset size parameter indicates a first number of HARQ-ACK/NACK feedback packets and the second subset size parameter indicates a second number of HARQ-ACK/NACK packets, and wherein selecting the first subset of HARQ-ACK/NACK feedback and the second subset of HARQ-ACK/NACK feedback comprises:
   selecting the first number of HARQ-ACK/NACK feedback packets from the first set of HARQ-ACK/NACK feedback stored in the first buffer; and selecting the second number of HARQ-ACK/NACK feedback packets from the second set of HARQ-ACK/NACK feedback stored in the second buffer.

5. The method of claim 1, further comprising:
receiving a configuration indicating a first uplink resource for the first subset of HARQ-ACK/NACK feedback and a second uplink resource for the second subset of HARQ-ACK/NACK feedback.

6. The method of claim 5, wherein the first uplink resource is a first physical uplink control channel (PUCCH) resource, and the second uplink resource is a second PUCCH resource.

7. The method of claim 5, wherein transmitting, during the uplink slot, at least one of the first subset of HARQ-ACK/NACK feedback or the second subset of HARQ-ACK/NACK feedback comprises:
based at least in part on a determination that the first uplink resource and the second uplink resource do not overlap in a time domain:
transmitting the first subset of HARQ-ACK/NACK feedback in the uplink slot using the first uplink resource; and
transmitting the second subset of HARQ-ACK/NACK feedback in the uplink slot using the second uplink resource.

8. The method of claim 5, wherein transmitting, during the uplink slot, at least one of the first subset of HARQ-ACK/NACK feedback or the second subset of HARQ-ACK/NACK feedback comprises:
based at least in part on a determination that the first uplink resource and the second uplink resource at least partially overlap in a time domain:
transmitting the first subset of HARQ-ACK/NACK feedback in the uplink slot using the first uplink resource; and
deferring the second subset of HARQ-ACK/NACK feedback to a subsequent uplink slot.

9. The method of claim 5, wherein transmitting, during the uplink slot, at least one of the first subset of HARQ-ACK/NACK feedback or the second subset of HARQ-ACK/NACK feedback comprises:
based at least in part on a determination that the first uplink resource and the second uplink resource at least partially overlap in a time domain:
transmitting the first subset of HARQ-ACK/NACK feedback in the uplink slot using the first uplink resource; and
dropping the second subset of HARQ-ACK/NACK feedback.

10. The method of claim 5, wherein transmitting, during the uplink slot, at least one of the first subset of HARQ-ACK/NACK feedback or the second subset of HARQ-ACK/NACK feedback comprises:
based at least in part on a determination that the first uplink resource and the second uplink resource at least partially overlap in a time domain:
multiplexing the second subset of HARQ-ACK/NACK feedback with the first subset of HARQ-ACK/NACK feedback on the first uplink resource in the uplink slot.

11. The method of claim 10, wherein transmitting, during the uplink slot, at least one of the first subset of HARQ-ACK/NACK feedback or the second subset of HARQ-ACK/NACK feedback further comprises:
compressing the second subset of HARQ-ACK/NACK feedback prior to multiplexing the second subset of HARQ-ACK/NACK feedback with the first subset of HARQ-ACK/NACK feedback on the first uplink resource.

12. The method of claim 5, further comprising:
receiving, from a base station, an indication of an action to be performed by the UE in connection with a determination that the first uplink resource and the second uplink resource at least partially overlap in a time domain.

13. The method of claim 12, wherein the action to be performed by the UE in connection with a determination that the first uplink resource and the second uplink resource at least partially overlap in a time domain includes:
deferring the second subset of HARQ-ACK/NACK feedback to a subsequent uplink slot;
dropping the second subset of HARQ-ACK/NACK feedback; or
multiplexing the second subset of HARQ-ACK/NACK feedback with the first subset of HARQ-ACK/NACK feedback on the first uplink resource.

14. The method of claim 1, further comprising:
receiving the set of downlink communications associated with the first priority during a first set of semi-persistent scheduling (SPS) downlink occasions; and
receiving the set of downlink communications associated with the second priority during a second set of SPS downlink occasions.

15. The method of claim 1, wherein the first subset size parameter indicates a maximum number of HARQ-ACK/NACK feedback packets for the first subset of HARQ-ACK/NACK feedback, and the second subset size parameter indicates a maximum number of HARQ-ACK/NACK feedback packets for the second subset of HARQ-ACK/NACK feedback.

16. The method of claim 15, wherein the first subset of HARQ-ACK/NACK feedback includes a respective HARQ-ACK feedback packet for each HARQ-ACK/NACK feedback in the first subset of HARQ-ACK/NACK feedback, and wherein the second subset of HARQ-ACK/NACK feedback includes a respective HARQ-ACK feedback packet for each HARQ-ACK/NACK feedback in the second subset of HARQ-ACK/NACK feedback.

17. The method of claim 1, wherein the uplink slot is at least one of:
a next available uplink slot to send deferred HARQ-ACK/NACK feedback, or
a configured slot associated with a codebook, triggered by downlink control information (DCI) received from a base station, for collection of deferred HARQ-ACK/NACK feedback associated with the first priority and the second priority.

18. A user equipment (UE) for wireless communication, comprising:
a memory; and
one or more processors coupled to the memory, the one or more processors configured to:
receive an indication of a first subset size parameter for consolidated hybrid automatic repeat request (HARQ) acknowledgment or negative acknowledgment (HARQ-ACK/NACK) feedback associated with downlink communications having a first priority, and an indication of a second subset size parameter for consolidated HARQ-ACK/NACK feedback associated with downlink communications having a second priority;
determine a first set of HARQ-ACK/NACK feedback associated with a set of downlink communications having the first priority and a second set of HARQ-ACK/NACK feedback associated with a set of downlink communications having the second priority;

select, for an uplink slot,
a first subset of HARQ-ACK/NACK feedback from the first set of HARQ-ACK/NACK feedback based at least in part on the first subset size parameter, and
a second subset of HARQ-ACK/NACK feedback from the second set of HARQ-ACK/NACK feedback based at least in part on the second subset size parameter; and
transmit, during the uplink slot, at least one of the first subset of HARQ-ACK/NACK feedback or the second subset of HARQ-ACK/NACK feedback.

19. The UE of claim 18, wherein the indication of the first subset size parameter is included in at least one semi-persistent scheduling (SPS) physical downlink shared channel (PDSCH) configuration associated with the first priority, and the indication of the second subset size parameter is included in at least one SPS PDSCH configuration associated with the second priority.

20. The UE of claim 18, wherein the one or more processors are further configured to:
store the first set of HARQ-ACK/NACK feedback associated with the set of downlink communications having the first priority in a first buffer; and
store the second set of HARQ-ACK/NACK feedback associated with the set of downlink communications having the second priority in a second buffer.

21. The UE of claim 20, wherein the first subset size parameter indicates a first number of HARQ-ACK/NACK feedback packets and the second subset size parameter indicates a second number of HARQ-ACK/NACK packets, and wherein the one or more processors, to select the first subset of HARQ-ACK/NACK feedback and the second subset of HARQ-ACK/NACK feedback, are configured to:
select the first number of HARQ-ACK/NACK feedback packets from the first set of HARQ-ACK/NACK feedback stored in the first buffer; and
select the second number of HARQ-ACK/NACK feedback packets from the second set of HARQ-ACK/NACK feedback stored in the second buffer.

22. The UE of claim 18, wherein the one or more processors are further configured to:
receive a configuration indicating a first uplink resource for the first subset of HARQ-ACK/NACK feedback and a second uplink resource for the second subset of HARQ-ACK/NACK feedback.

23. The UE of claim 22, wherein the one or more processors, to transmit, during the uplink slot, at least one of the first subset of HARQ-ACK/NACK feedback or the second subset of HARQ-ACK/NACK feedback, are configured to:
based at least in part on a determination that the first uplink resource and the second uplink resource do not overlap in a time domain:
transmit the first subset of HARQ-ACK/NACK feedback in the uplink slot using the first uplink resource; and
transmit the second subset of HARQ-ACK/NACK feedback in the uplink slot using the second uplink resource.

24. The UE of claim 22, wherein the one or more processors, to transmit, during the uplink slot, at least one of the first subset of HARQ-ACK/NACK feedback or the second subset of HARQ-ACK/NACK feedback, are configured to:
based at least in part on a determination that the first uplink resource and the second uplink resource at least partially overlap in a time domain:
transmit the first subset of HARQ-ACK/NACK feedback in the uplink slot using the first uplink resource; and
defer the second subset of HARQ-ACK/NACK feedback to a subsequent uplink slot.

25. The UE of claim 22, wherein the one or more processors, to transmit, during the uplink slot, at least one of the first subset of HARQ-ACK/NACK feedback or the second subset of HARQ-ACK/NACK feedback, are configured to:
based at least in part on a determination that the first uplink resource and the second uplink resource at least partially overlap in a time domain:
transmit the first subset of HARQ-ACK/NACK feedback in the uplink slot using the first uplink resource; and
drop the second subset of HARQ-ACK/NACK feedback.

26. The UE of claim 22, wherein the one or more processors, to transmit, during the uplink slot, at least one of the first subset of HARQ-ACK/NACK feedback or the second subset of HARQ-ACK/NACK feedback, are configured to:
based at least in part on a determination that the first uplink resource and the second uplink resource at least partially overlap in a time domain:
multiplex the second subset of HARQ-ACK/NACK feedback with the first subset of HARQ-ACK/NACK feedback on the first uplink resource in the uplink slot.

27. The UE of claim 22, wherein the one or more processors are further configured to:
receive, from a base station, an indication of an action to be performed by the UE in connection with a determination that the first uplink resource and the second uplink resource at least partially overlap in a time domain, wherein the indication of the action to be performed by the UE in connection with the determination that the first uplink resource and the second uplink resource at least partially overlap in a time domain includes:
an indication to defer the second subset of HARQ-ACK/NACK feedback to a subsequent uplink slot;
an indication to drop the second subset of HARQ-ACK/NACK feedback; or
an indication to multiplex the second subset of HARQ-ACK/NACK feedback with the first subset of HARQ-ACK/NACK feedback on the first uplink resource.

28. The UE of claim 18, wherein the uplink slot is at least one of:
a next available uplink slot to send deferred HARQ-ACK.NACK feedback, or
a configured slot associated with a codebook, triggered by downlink control information (DCI) received from a base station, for collection of deferred HARQ-ACK/NACK feedback associated with the first priority and the second priority.

29. A non-transitory computer-readable medium storing a set of instructions for wireless communication, the set of instructions comprising:

one or more instructions that, when executed by one or more processors of a user equipment (UE), cause the UE to:
    receive an indication of a first subset size parameter for consolidated hybrid automatic repeat request (HARQ) acknowledgment or negative acknowledgment (HARQ-ACK/NACK) feedback associated with downlink communications having a first priority, and an indication of a second subset size parameter for consolidated HARQ-ACK/NACK feedback associated with downlink communications having a second priority;
    determine a first set of HARQ-ACK/NACK feedback associated with a set of downlink communications having the first priority and a second set of HARQ-ACK/NACK feedback associated with a set of downlink communications having the second priority;
    select, for an uplink slot,
        a first subset of HARQ-ACK/NACK feedback from the first set of HARQ-ACK/NACK feedback based at least in part on the first subset size parameter, and
        a second subset of HARQ-ACK/NACK feedback from the second set of HARQ-ACK/NACK feedback based at least in part on the second subset size parameter; and
    transmit, during the uplink slot, at least one of the first subset of HARQ-ACK/NACK feedback or the second subset of HARQ-ACK/NACK feedback.

30. An apparatus for wireless communication, comprising:
    means for receiving an indication of a first subset size parameter for consolidated hybrid automatic repeat request (HARQ) acknowledgment or negative acknowledgment (HARQ-ACK/NACK) feedback associated with downlink communications having a first priority, and an indication of a second subset size parameter for consolidated HARQ-ACK/NACK feedback associated with downlink communications having a second priority;
    means for determining a first set of HARQ-ACK/NACK feedback associated with a set of downlink communications having the first priority and a second set of HARQ-ACK/NACK feedback associated with a set of downlink communications having the second priority;
    means for selecting, for an uplink slot,
        a first subset of HARQ-ACK/NACK feedback from the first set of HARQ-ACK/NACK feedback based at least in part on the first subset size parameter, and
        a second subset of HARQ-ACK/NACK feedback from the second set of HARQ-ACK/NACK feedback based at least in part on the second subset size parameter; and
    means for transmitting, during the uplink slot, at least one of the first subset of HARQ-ACK/NACK feedback or the second subset of HARQ-ACK/NACK feedback.

\* \* \* \* \*